US012647508B2

(12) United States Patent
Agrawal et al.

(10) Patent No.: US 12,647,508 B2
(45) Date of Patent: Jun. 2, 2026

(54) DYNAMICALLY ADAPTING VISUAL CHARACTERISTICS OF AN ELECTRONIC DEVICE'S EXTERIOR MATERIAL TO PROVIDE CONTEXTUAL VISUAL CUES

(71) Applicant: MOTOROLA MOBILITY LLC, Wilmington, DE (US)

(72) Inventors: Amit Kumar Agrawal, Bangalore (IN); Eunji Kim, Chicago, IL (US); Mayank Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 412 days.

(21) Appl. No.: 18/494,530

(22) Filed: Oct. 25, 2023

(65) Prior Publication Data

US 2025/0141992 A1 May 1, 2025

(51) Int. Cl.
H04M 1/72454 (2021.01)
H04M 1/72484 (2021.01)

(52) U.S. Cl.
CPC ... H04M 1/72454 (2021.01); H04M 1/72484 (2021.01); *H04M 2250/12* (2013.01)

(58) Field of Classification Search
CPC ........... H04M 1/0283; H04M 1/72454; H04M 1/72484; H04M 2250/12; H04M 2250/22
See application file for complete search history.

(56) References Cited

U.S. PATENT DOCUMENTS

| | | | | |
|---|---|---|---|---|
| 8,886,258 | B2 * | 11/2014 | Alameh | H04M 1/05 |
| | | | | 713/340 |
| 8,933,877 | B2 * | 1/2015 | Alameh | G06F 3/014 |
| | | | | 345/169 |
| 9,116,567 | B2 * | 8/2015 | Alberth, Jr. | G06F 3/0488 |
| 9,423,995 | B2 * | 8/2016 | Arneson | G06F 3/0416 |
| 9,612,622 | B2 * | 4/2017 | Moon | H02H 6/00 |
| 9,740,839 | B2 * | 8/2017 | Zafiris | G06F 1/1694 |
| 11,196,852 | B2 * | 12/2021 | Li | H04M 1/185 |
| 11,968,319 | B2 * | 4/2024 | Desai | H04M 1/026 |
| 12,056,414 | B2 * | 8/2024 | Desai | H04M 1/72454 |
| 2011/0194230 | A1 * | 8/2011 | Hart | H04M 1/185 |
| | | | | 361/437 |
| 2021/0392255 | A1 * | 12/2021 | Zhu | H04N 23/63 |

FOREIGN PATENT DOCUMENTS

WO    2018032707 A1    2/2018

* cited by examiner

*Primary Examiner* — Ronald Eisner
(74) *Attorney, Agent, or Firm* — Isidore PLLC

(57) ABSTRACT

An electronic device includes an external panel material having an exterior visual characteristic that can be dynamically changed by a device-generated trigger. A controller of the device is communicatively coupled to at least one orientation sensor. The controller receives an input corresponding to a first context pre-identified as a condition that triggers a change in the exterior visual characteristic of the material. The controller identifies from sensor input received from the at least one orientation sensor whether the electronic device is in a first orientation that enables the external panel to be visible to a device user. In response to the electronic device being in the first orientation concurrently with receiving the input corresponding to the first context, the controller generates and transmits a change activation signal that changes the exterior visual characteristic of the external panel material from a first visible state to a second visible state.

20 Claims, 11 Drawing Sheets

DISPLAY

[PRIMARY
NOTIFICATION
INTERFACE]

Incoming Call
Wife

400

| Device Position | Category | Sensor/Trigger Input | Context | Range/Threshold | Ext. Color | Duration |
|---|---|---|---|---|---|---|
| Device facing up [User interface visible] | Normal Operation | N/A | Default | N/A | Base color | |
| Device Upside Down/ Panel Up | Emotional/ Biological/Physiological | UWD | Elevated Heartrate | >80bpm | Red | Until Reset |
| | | UWD | High Blood pressure | >normal range | Orange | Intermittent |
| | | ICD/Mic/UWD | Stress Level | Elevated | Yellow | No longer elevated |
| | DND | Notifications | Notification Type [Urgent/Pre-selected] | Matches type | Second Color | notification read/dismissed |
| | | Incoming | Pre-Authorized User1 | Matches ID | Blue | Until end of |
| | | Communication | Pre-Authorized User1 | Matches ID | Green | notification/Touch |
| | Location & Ambiance | GPS data | Location, Location Type | Geographical map | Low color hue | 10 seconds |
| | | ICD, GPS, etc. | Ambiance/Theme | | Selected Motif | change in location |
| | Device Parameter | Device Timer | Screen time | >10 Hours | Second Color | |
| | | | Available Battery charge | <10% | Battery motif | |
| | | Data | Bandwidth usage | >90% | Third color | |
| | Location to Other Devices | UWB | Proximity | 2+ total devices | Lime Green | Until Pickup by User |

CTX 1

100b     520b

192

100c     520c

192

CTX 2

550

Panel Material Color Map

☐ Silver

▨ Black

▦ Yellow

▨ Striped Grey

■ Red

⋮    ⋮

CTX 3

100d     520d

192

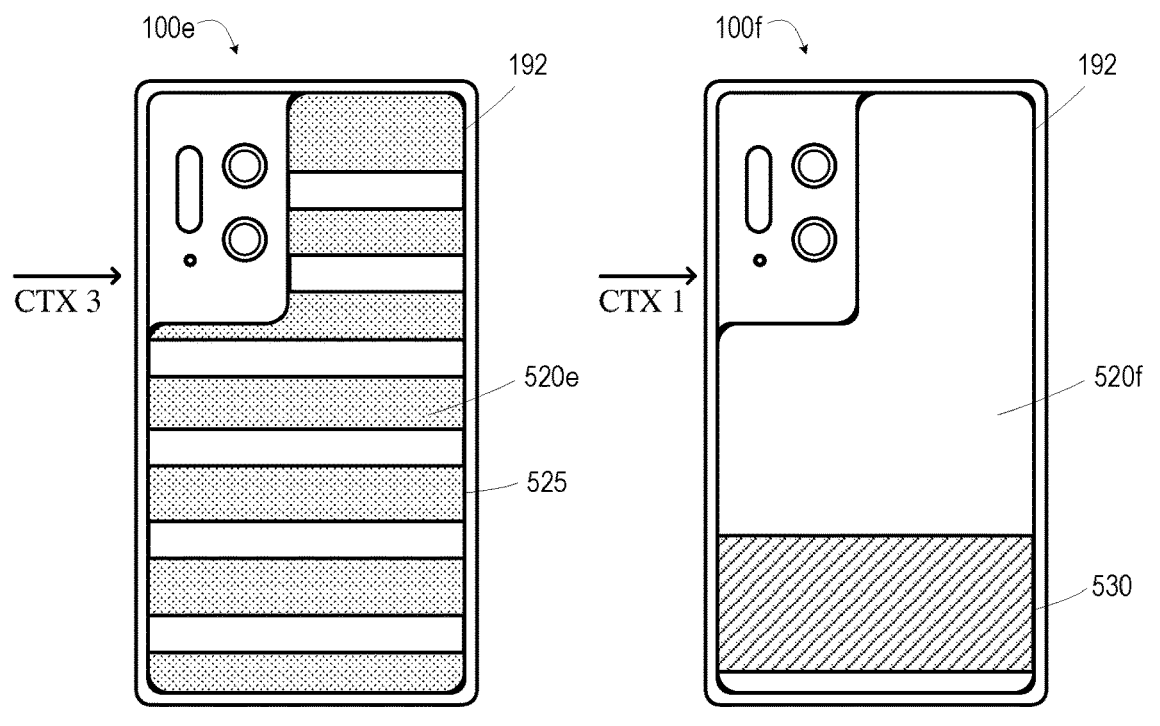
FIG. 5E
FIG. 5F
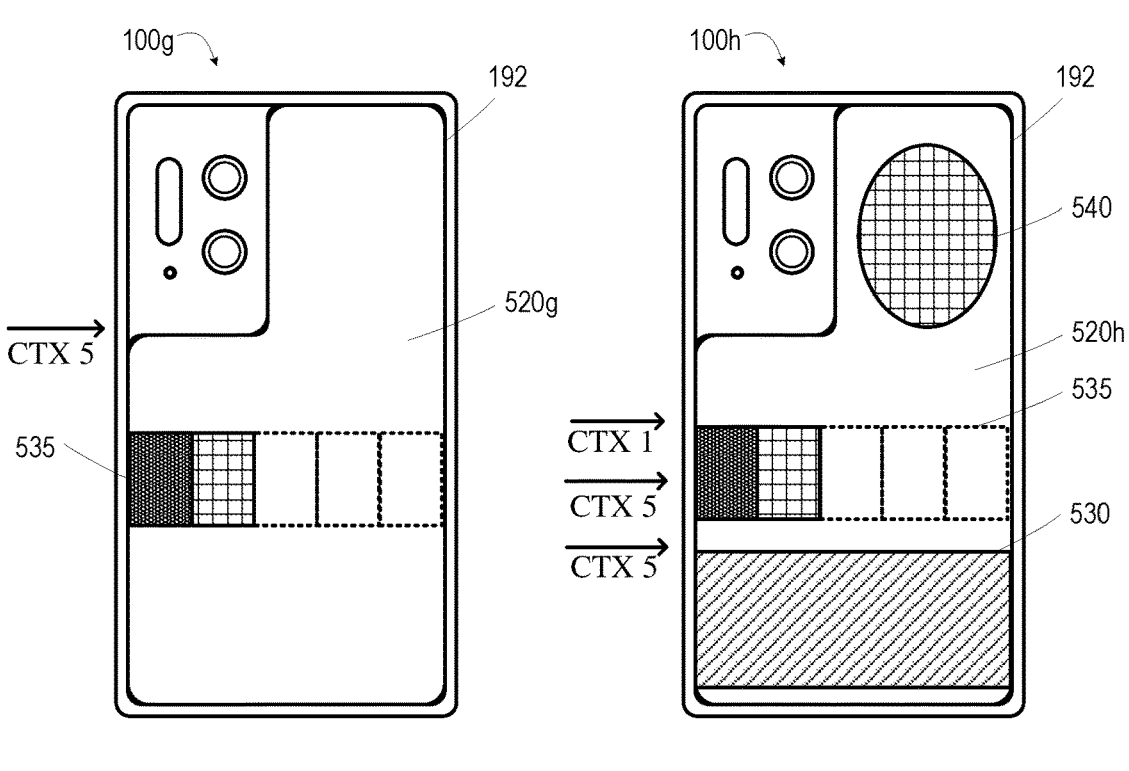
FIG. 5G
FIG. 5H

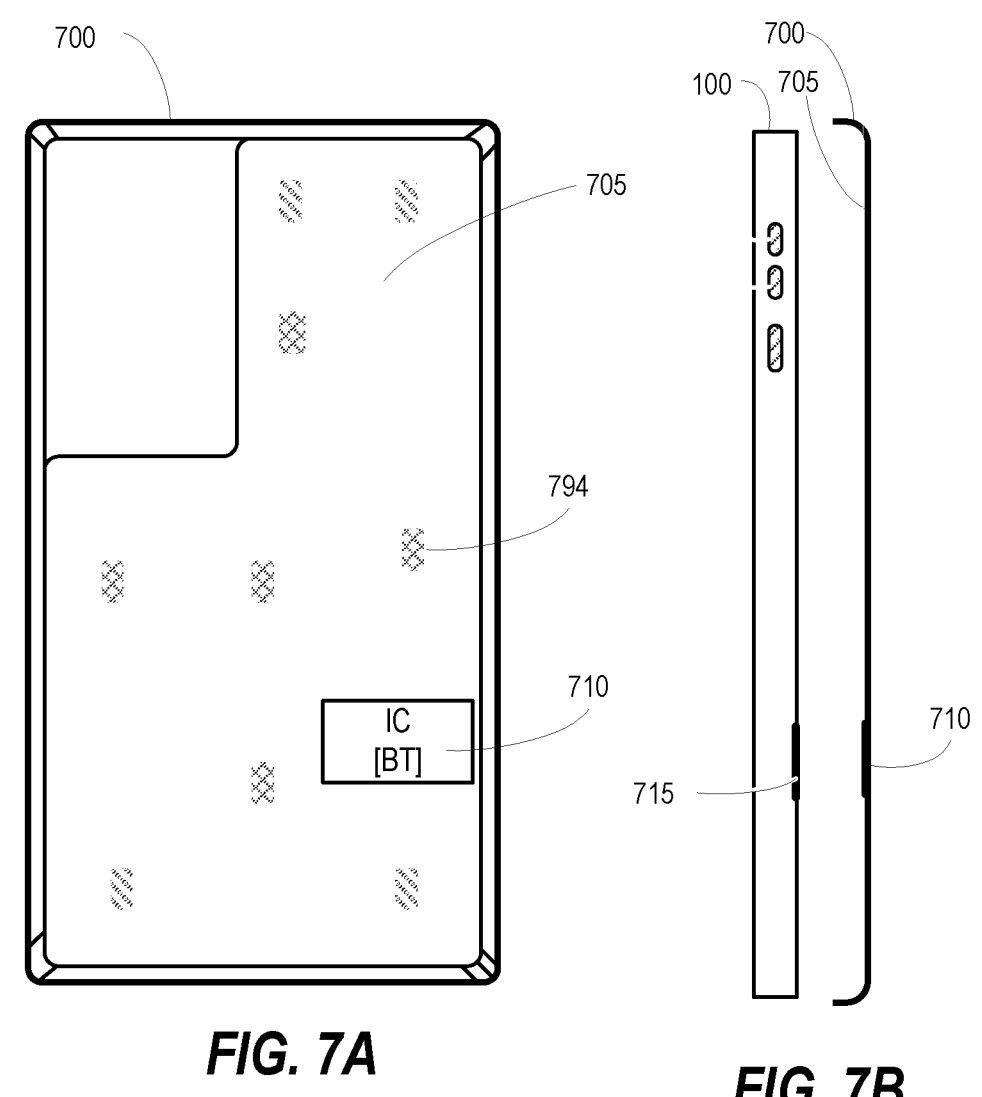
FIG. 7A
FIG. 7B
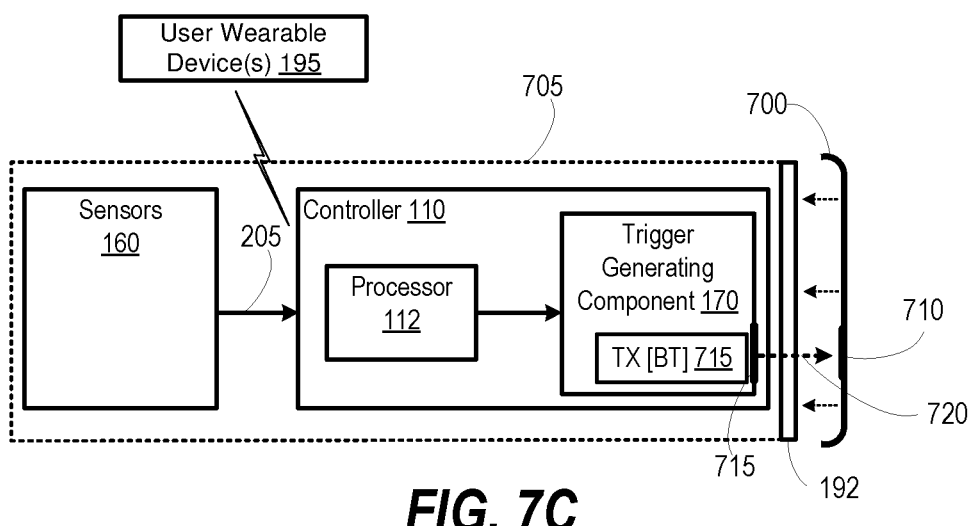
FIG. 7C

800

DYNAMICALLY ADAPTING VISUAL CHARACTERISTICS OF AN ELECTRONIC DEVICE'S EXTERIOR MATERIAL TO PROVIDE CONTEXTUAL VISUAL CUES

BACKGROUND

1. Technical Field

The present disclosure relates generally to portable electronic devices, and more particularly to the exterior casing of portable electronic devices.

2. Description of the Related Art

Portable electronic devices, such as smartphones, have become ubiquitous. These portable electronic devices include sensitive interior circuitry that are partially enclosed by an exterior protective casing or housing. The exterior casing includes one or more open spaces for integration of a device display, and smaller openings for integration of additional exterior components, such as input/output (I/O) buttons, power buttons, etc. Many modern devices are configured with a full display encompassing the entire front side of the electronic device, with a casing made of durable material (e.g., metal) primarily occupying the back and sides of the electronic device. Typically, manufacturers of these devices provide different color choices for the exterior surface of the rear and side casing panels. Users are thus able to select a device with a color of their choice. Additionally, some users chose to add an exterior casing to further personalize their device or to provide another layer of protection to the device in the event the device falls.

The majority of the user interfacing features of the device are presented via the front facing display of the device, at which notifications, such as incoming calls or text messages or a calendared event, are presented for the user to see. These notifications can present a distraction when the user does not wish to be interfacing with his/her device, such as when focusing on important work tasks. In such situations, users oftentimes will place the device face down on a surface so that only the back surface of the device is visible. While in this orientation, and in particular when the device is placed in a do-not-disturb (or silent) mode, the user is unaware of what notifications are received.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 presents a table illustrating example mappings between different categories of detected or determined contexts and associated sensor inputs/triggers that cause the changes in the color of the exterior material of the rear panel of the electronic device, according to a plurality of embodiments;

FIGS. 5E-5H present alternate modes of changing color of the rear surface material, including partial and segmented application of color changes instead of a complete change of the entire rear surface to a single color, according to a plurality of embodiments;

FIG. 7A-7C illustrate an example exterior casing with embedded electronics that enables a linked portable device to which the casing is attached to trigger dynamic changing of the color of the exterior material of the casing, in response to device-sensed or device-determined contexts, according to one or more embodiments;

DETAILED DESCRIPTION

Figure 1:
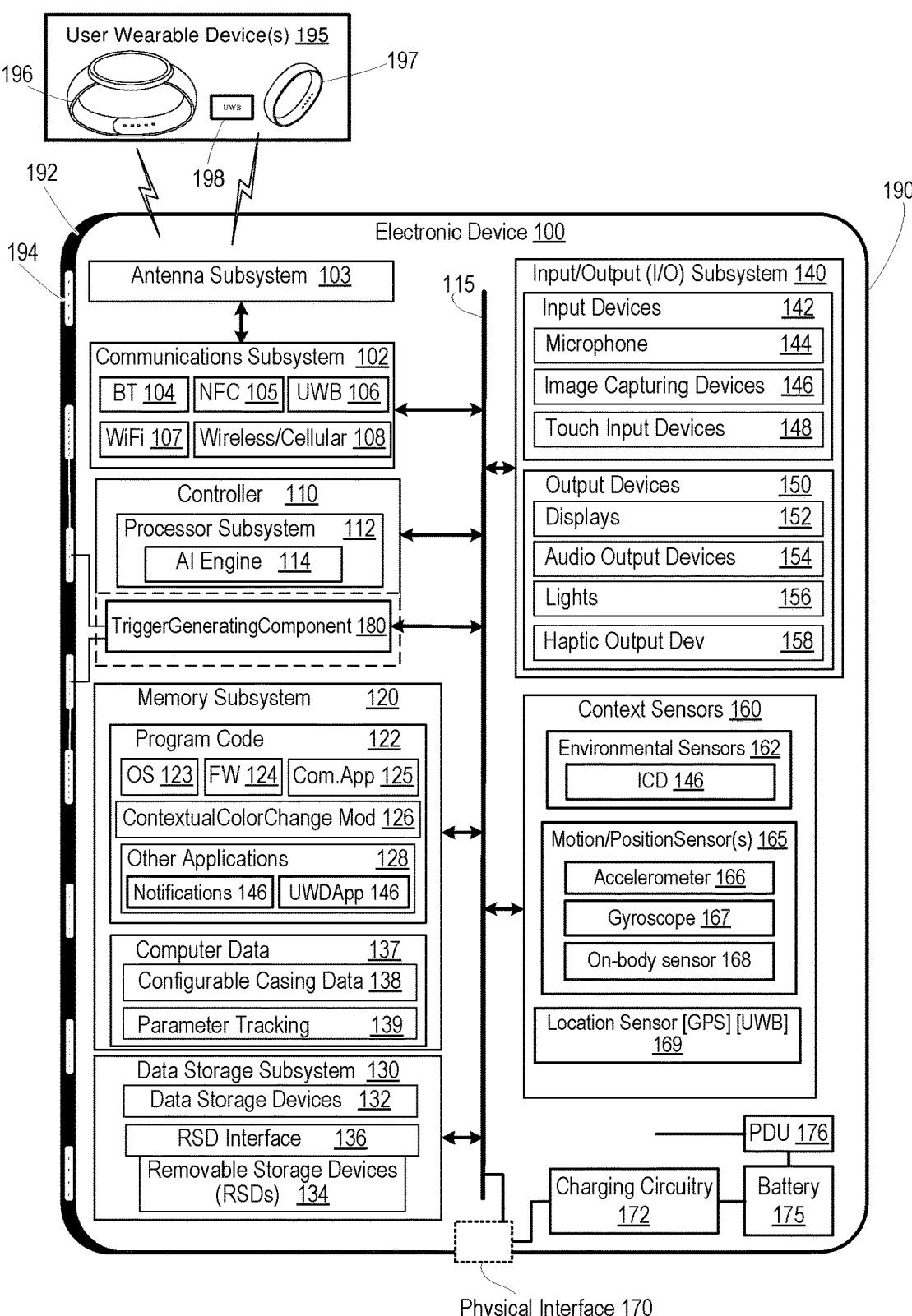
FIG. 1 presents a block component diagram of an electronic device configured with a modifiable exterior rear panel and integrated electronics that dynamically changes a color of the exterior surface of the panel in response to specific pre-identified contextual triggers associated with the device and/or the device user, according to one or more embodiments.

The present disclosure provides an electronic device, a method, and a computer program product for dynamically modifying visible characteristics of the material of an exterior rear panel or attached casing to provide visible notification to a device user of a context being monitored by the device. According to a first aspect of the present disclosure, the electronic device includes an external panel comprised of a material having an exterior visual characteristic that can be dynamically changed by a device-generated trigger. The external panel is opposed to a primary notification interface of the electronic device, i.e., the primary display. The electronic device also includes at least one orientation sensor that detects when the electronic device is in a first orientation among a plurality of device orientations, the first orientation enabling the external panel to be visible to the device user. The electronic device includes a controller communicatively coupled to the at least one orientation sensor and which receives an input corresponding to a first context. The first context is one that is pre-identified as a condition that triggers a change in the exterior visual characteristic of the material. The controller: identifies from sensor input received from the orientation sensor whether the electronic device is in the first orientation; and in response to the electronic device being in the first orientation concurrently with receiving the input corresponding to the first context, generates and transmits a change activation signal that results in a change in the exterior visual characteristic of the material from a first visible state to a second visible state. In one or more embodiments, the exterior visual characteristic is an exterior color of the material, the first visible state is a first color, and the second visible state is a second, different color.

Occasionally, a device user does not want to directly interface with the device and places the device face down on a table or desktop to conceal or prevent access to the interface, such that only the back/rear surface of the device is visible. Situations where the user may place the device face down include, but are not limited to, while the user is focusing on important work tasks and while the user does not want to be disturbed by incoming notifications or calls (e.g., the device is placed in a do-not-disturb (or silent) mode). While the device is in this orientation, the user may miss important notifications or calls from an important colleague or family member or about an upcoming meeting the user must attend. Further, some users connect their devices to a user wearable, such as a health or fitness tracking device, which triggers presentation on the primary user interface of health-related information when the associated application is opened on the user interface. The presentation of health-related information is not visible to the user while the device is in the faced down orientation. These and other important functions are temporarily unavailable to the user and the user is not made aware of the event or occurrence while the device is faced down. Additionally, while in the faced down orientation, many portable user devices can look the same, particularly where multiple users have the same device (e.g., a newest model device that is very popular and common). Finding which device belongs to the users can require the user flip over each of the different devices and activate the start-up/unlock screen on the devices.

By integrating the dynamic color changing feature into the back surface material of the portable electronic device, the user of the electronic device can receive important information about different contexts that are being monitored by the electronic device or connected wearable device. The user is thus able to avoid the distractions of having the primary user interface on and visible to the user, while the user is trying to focus on other things or does not want to be disturbed, but still receive alerts about important events, notifications, health conditions, etc. that the user deems important enough to override the user's desire to not directly interface with the device.

One additional aspect of the disclosure provides an electronic device cover that includes an exterior material having a configurable visible characteristic, such as color or texture, that can be changed based on a received device-provided trigger generated in response to a detected or determined context associated with a user of an electronic device or with the electronic device on which the electronic device cover is placed. In one embodiment, the received device-provided trigger is a signal used to change at least one of a voltage, a pressure, a current, a temperature, or a humidity applied to the exterior material by the electronic device, in response to the detected or determined context. In one or more embodiments, the electronic device cover includes electronics for: communicatively coupling the cover to the controller of the electronic device to which the cover is attached; receiving the device-provided signal from the controller of the electronic device, via a transmitter; and locally triggering the change in the material's visible characteristic (e.g., color or texture) on receipt of the device-provided signal. The controller of the electronic device is communicatively connected to a transmitter that is paired to the electronics embedded in the electronic device cover.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

In the description of each of the following figures, reference is also made to specific components illustrated within the preceding figure(s). Similar components are presented with the same reference number and some components may be provided with a subscripted reference number (e.g., 100a, 100b) to represent a same component/device being shown in a different context/configuration.

FIG. 1 presents a block component diagram of an electronic device configured with a modifiable exterior rear panel and integrated electronics that dynamically changes a color (or other visible characteristics) of the exterior surface of the rear panel in response to specific pre-identified contextual triggers associated with the device and/or the device user, according to one or more embodiments. Electronic device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that has an exterior panel as a part of a housing structure. Electronic device 100 can be a communication device that includes/supports wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

With continued reference to FIG. 1, electronic device 100 includes controller 110, which includes processor subsystem 112, which controls operations of electronic device 100. Communication device 100 also includes memory subsystem 120, data storage subsystem 130, input/output (I/O) subsystem 140, context sensors 160, and communications subsystem 102. Each subsystem and context sensor is communicatively connected to controller 110 via system interlink 115 enabling controller 110 to manage the functions of the individual subsystems and receive data from the context sensors. System interlink 115 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 115) are illustrated in FIG. 1, it is to be understood that more, fewer, or different interconnections may be present in other embodiments. For example, a direct 1-to-1 connection can be established between controller 110 and specific ones of the other components within electronic device 100.

Controller 110 includes processor subsystem 112, which includes one or more central processing units (CPUs) or data processors. Processor subsystem 112 can include one or more digital signal processors that can be integrated with data processor(s). Processor subsystem 112 can include other processors such as auxiliary processor(s) that may act as a low power consumption, always-on sensor hub for physical sensors. Controller 110 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

In one or more embodiments, a color change component is provided and can be incorporated within the controller as trigger generating component 180. The device-generated trigger is transmitted by the controller, via the trigger generating component, to visual characteristics (or color) changing elements 194 that cause or activate the change in the color of the external surface material. While the embodiments described herein are presented with respect to changing the color of the exterior material, it is appreciated that the disclosure applies generally to changes to visible characteristics of the exterior material, where color is presented as one such visible characteristics that can be changed. Other embodiments can apply to other visible characteristics of the exterior material, such as texture and shape and patterns (striped, wavy, etc.), without limitation.

Memory subsystem 120 includes operating system (OS) 123, firmware interface, such as basic input/output system (BIOS) or Uniform Extensible Firmware Interface (UEFI), and firmware 124, which also includes code and may thus be considered as program code 122. Memory subsystem 120 stores program code 122 for execution by processor subsystem 112 to provide the functionality described herein. Program code 122 includes applications such as communication application 125, which is used for enabling device communication with an external network and second devices. According to one aspect of the disclosure, program code 122 includes Contextual Color/Characteristics Change (CCC) Module 126 and other applications 128. These applications may be software or firmware that, when executed by controller 110, configures electronic device 100 to provide the functionality described herein. In one or more embodiments, several of the described aspects of the present disclosure are provided via executable program code of CCC module 126 executed by controller 110. In one or more embodiments, program code 122 may be integrated into a distinct chipset or hardware module as firmware that operates separately from executable program code. Portions of program code 122 may be incorporated into different hardware components that operate in a distributed or collaborative manner. Implementation of program code 122 may use any known mechanism or process for doing so using integrated hardware and/or software, as known by those skilled in the art.

Program code 122 may access, use, generate, modify, store, or communicate computer data 137, such as configurable casing (panel) data 138 and parameter tracking data 139. Computer data 137 may incorporate "data" that originated as raw, real-world "analog" information that consists of basic facts and figures. Computer data 137 includes different forms of data, such as numerical data, images, coding, notes, and financial data. Computer data 137 may originate at electronic device 100 or be retrieved by electronic device 100 from a second device, such as network server (not shown), to which electronic device 100 can communicatively connect via communications subsystem 102. Electronic device 100 may store, modify, present, or transmit computer data 137.

Data storage subsystem 130 of electronic device 100 includes data storage device(s) 132, which are nonvolatile storage. Controller 110 is communicatively connected, e.g., via system interlink 115, to data storage device(s) 132. Data storage subsystem 130 provides program code 122 and computer data 137 that can be loaded into memory subsystem 120 for execution/processing by controller 110. In one or more embodiments, data storage device(s) 132 can include hard disk drives (HDDs), optical disk drives, and/or solid-state drives (SSDs), etc. Data storage subsystem 130 of electronic device 100 can include removable storage device(s) (RSD(s)) 134, which is received in RSD interface 136. In one or more embodiments, RSD 134 is a computer readable storage device encoded with program code and corresponding data, and RSD 134 can be interchangeably referred to as a non-transitory computer program product. Controller 110 can access data storage device(s) 132 or RSD 134 to provision electronic device 100 with program code 122 and computer data 137.

I/O subsystem 140 may include input devices 142 such as microphone 144, image capturing devices (or cameras) 146, and touch input devices 148 (e.g., touch screens, keys or buttons). I/O subsystem 140 may include output devices 150 such as display(s) 152, audio output devices 154, lights 156, and vibratory or haptic output devices 158.

Communications subsystem 102 includes transceivers and modems for enabling wireless (over-the-air (OTA) cellular) network communication and local network communication via one or more antennas in antenna subsystem 103. In one or more embodiments, controller 110, via communications subsystem 102, performs localized wireless communication, such as by using a Bluetooth communication module 104, or other near field communication module 105, or WiFi module 107 to establish personal access network (PAN) connections with external devices, such as user wearable devices 195. User wearable devices can include a smart watch 196 or smart/transmissive ring or bracelet 197. As described below, smart watch 196 and smart ring (or bracelet) 197 can include fitness and health applications/ functionality that monitor one or more health or fitness conditions of a user, such as blood pressure, heartrate, blood sugar level, pulse, etc.). While a smart watch 196 and smart ring/bracelet 197 are presented as specific examples, it is appreciated that other types of user wearable devices 195 can similarly be included within the devices that provide the described monitoring and other features presented herein. For example, the user wearable devices 195 can include an earbud or another smartphone carried or worn by the user (e.g., a smart phone having flexible form factor and capable of being worn around a wrist or arm of the user). The term user wearable devices 195 can also extend to and/or encompass other devices that are attached to the user's clothing or carried by the user, such as UWB transmitter 198. In one or more embodiments, communications subsystem 102 can include ultrawide band (UWB) transceiver module 106 that receives UWB signals from localize UWB tags or UWB transmitters 198 that can be attached to or integrated into an article of clothing or other personalized items of the user. In one or more embodiments, controller 110, via communications subsystem 102, communicates via a wireless local area network (WLAN) link, using one or more IEEE 802.11 WLAN protocols with a localized access point. In one or more embodiments, controller 110, via communications subsystem 102, may communicate via an OTA cellular connection with radio access networks (RANs).

According to one aspect of the disclosure, electronic device 100/200A also includes a plurality of device and/or user context sensors 160, which can be utilized to identify a plurality of different contexts associated with the device and/or the user. As illustrated, context sensors 160 can include environmental sensors 162, such as ICDs 146, by which the device monitors the environment surrounding the device to detect or identify triggers related to ambiance and style, etc. Also, when equipped with both front and back ICDs, ICDs 146 can be utilized to determine when the device is oriented face down on a surface or with the rear panel facing the user. Context sensors 160 can also include specific motion and position sensors 165 such as an accelerometer 166 and a gyroscope 167. Motion/position sensor(s) 165 can detect movement of electronic device 100 and provide motion and position data to processor 102 indicating the spatial orientation and movement of electronic device 100. Accelerometer(s) 166 measure linear acceleration of movement of electronic device 100 in multiple axes (X, Y and Z). Gyroscope 167 measures rotation or angular rotational velocity of electronic device 100, such as when the device is flipped over onto its front side (display) with the rear panel visible to a device user (i.e., the first orientation). In one or more embodiments, context sensors 160 can also include proximity/on-body detection sensor 168 to identify when the device is being held in a user's hand versus being stored in a pocket or located away from the user. Other types and/or different ones of device positioning sensors 160 can also be supported. Context sensors 160 can also include global positioning system (GPS) module 169 that receives GPS broadcasts from GPS satellites to obtain geospatial location information. Context sensors 160 can also include parameter tracking module 139 and notifications detection module 146. As the name implies, parameter tracking module 139 tracks a specific parameter (e.g., blood pressure or pulse) to detect when an out-of-range condition. Similarly, notifications detection module 146 identifies when a notification is to be surfaced, where the notification would customarily be visually surfaced using the primary display device or audibly surfaced via audible ring tone and/or haptic feedback.

Electronic device 100 also includes a physical interface 170 to which is coupled a charging circuitry 172 for charging device battery 175. Device battery 175 is coupled to power distribution unit (PDU) 176, which distributes power (voltage and current distribution) to the various components of electronic device 100 that require electrical power. Physical interface 170 also functions as a data port for transmitting data (using data cable connector to system interlink 115) to and from electronic device via an attached cable (not shown) that interfaces with physical interface 170.

Electronic device 100 includes an exterior housing 190 that generally includes a rear panel 192 made of a material or composite having a visual characteristic, such as color, that can be dynamically changeable by exposure to one or more device-generated triggers. It is appreciated that alternate embodiments can provide that in addition to or instead of the change in visual characteristics, a physical characteristic of the material may also be dynamically changeable by exposure to one or more device-generated triggers. According to one or more embodiments, the material or composite that is used to manufacture the rear panel 192 can include one or more surface color changing elements 194 that can individually or collectively cause a change in the exterior color of the rear panel material. In the illustrated embodiments of FIGS. 3-7, the change to the color is presented as a visible change; However, it is appreciated that in one or more embodiments, the change in color may not be visible to the naked eye, but can be a change that is noticeable with special glasses or with certain camera settings or only immediately noticeable to the user, based on a user setting. For example, the color change may be from black matted to black glossy, where the same base color is used.

Figure 2A:
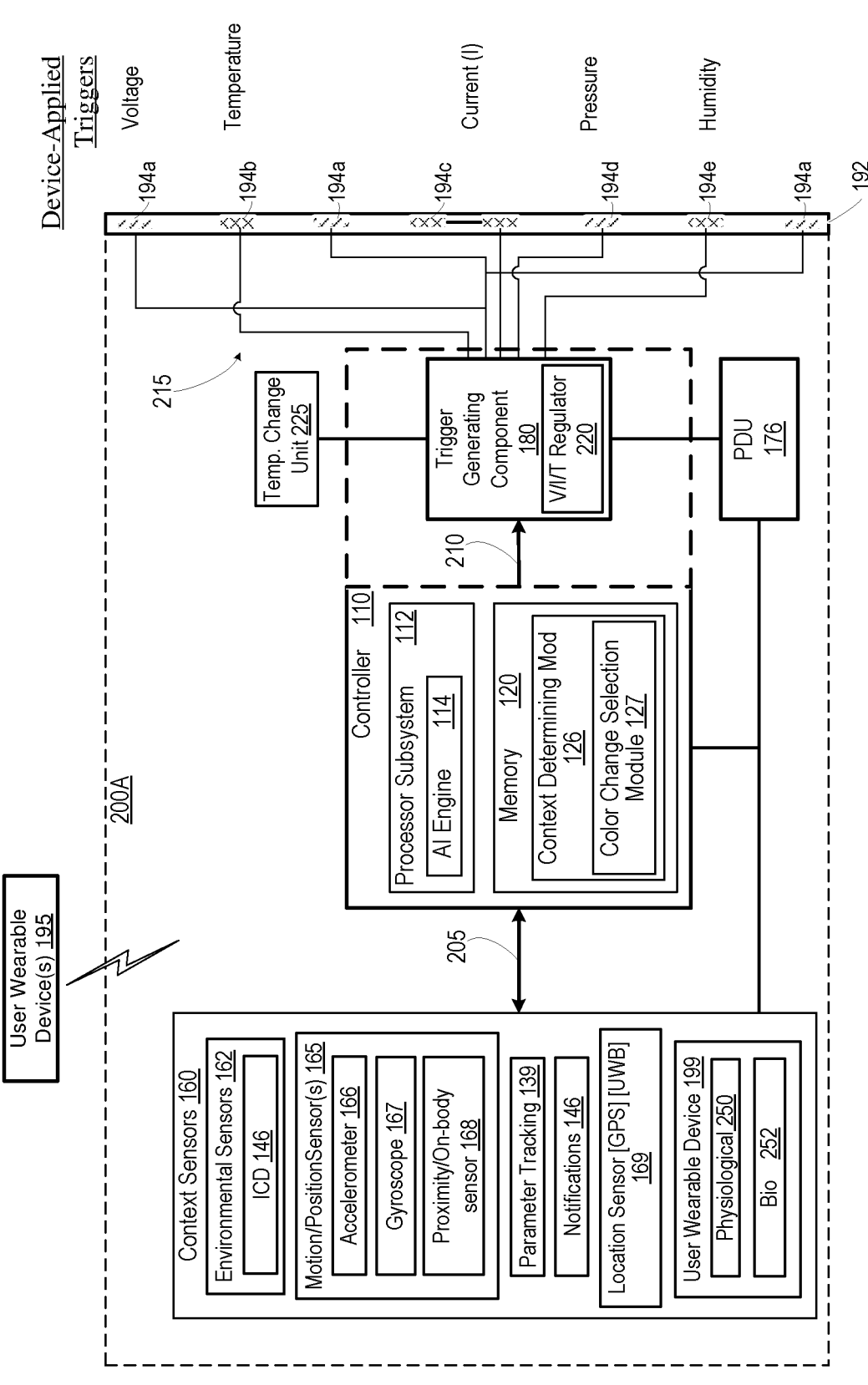
FIGS. 2A-2B are block diagrams illustrating interconnected device components, including contextual sensors and a trigger generating component causing the change in the color of the exterior rear panel of the electronic device in response to sensed or determined contexts, according to one or more embodiments.
Figure 2B:
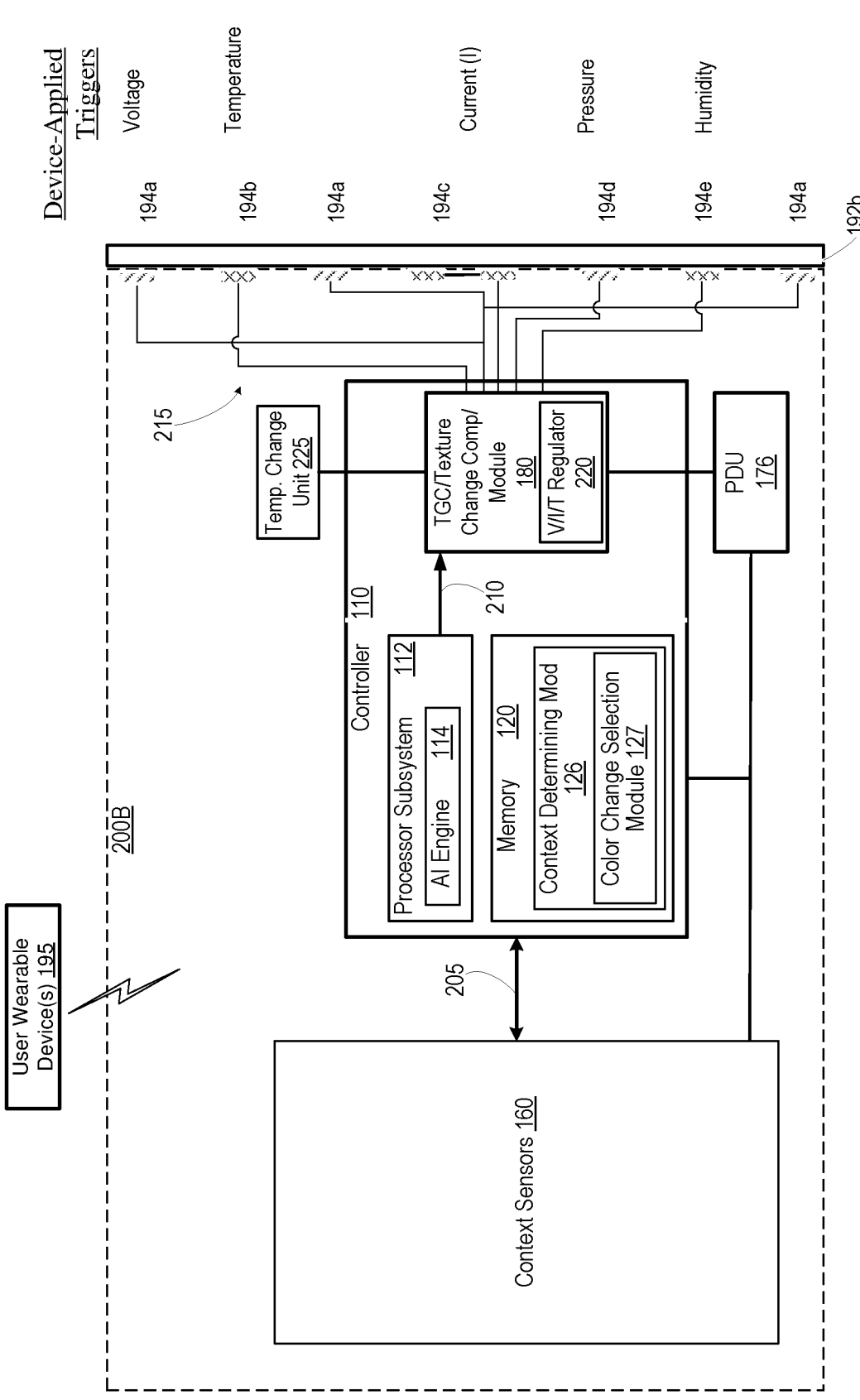

FIGS. 2A-2B are block diagrams illustrating interconnected device components, including contextual sensors 160 and a trigger generating component 180 causing the change in the color or other visual characteristics) of the exterior rear panel of the electronic device 200A-200B (collectively 200) in response to sensed or determined contexts, according to one or more embodiments. Electronic device 200A-200B are alternate representations of electronic device 100. FIGS. 2A-2B present several components that are the same components as those described above for FIG. 1. The description of FIGS. 2A-2B will thus focus primarily on the new features incorporated by FIGS. 2A-2B. According to the disclosure, the electronic device 200A/200B (collectively 200) includes at least one external surface (rear panel 192) comprised of a material whose visual characteristics, e.g., color, can be dynamically changed based on exposure to a parameter (e.g., voltage) or to change in a parameter (e.g., a voltage increase), which is generated/provided by a device-generated trigger. As listed to the right of the schematic diagram of FIG. 2A, the parameters or parameter change that result from the device-generated trigger(s) can include application of at least one of a voltage, a pressure, a current, a temperature, or a humidity to the material. In one or more embodiments, a single parameter can be utilized with a set of different values within a range of values that individually generate a different visible change in the visual characteristic. As an example, the parameter can be an applied current, and the range of current values can be from 0.1 amps to 0.8 amps in 0.1 amp increments (i.e., 0.1, 0.2, 0.3, . . . 0.8) for eight (8) distinct changes to the visual characteristic. Thus, the external material can be manufactured to provide 8 different color changes or 8 different hues of the same color. A similar application can involve temperature change unit 225, where each temperature level causes the exterior material to change to a different color. The amount of temperature change applied is then determined by the processor 112 based on which color change is desired for the particular context being monitored. In addition to the components introduced in FIG. 1, according to one or more embodiments, contextual sensors 160 also includes external sensors, which are presented as user wearable device sensors 199. User wearable device sensors 199 can be physiological sensors 166 or biological sensors 167.

According to one aspect of the disclosure, electronic device 200 is further configured with trigger generating component 180 that responds to receipt of a control/activation signal 210 from processor subsystem 112 by activating one or more device-generated triggers 215 that cause or results in modification of the exterior color of the rear panel material (192). In one or more alternate embodiments, as more clearly presented by FIG. 2B, the component 180 can be incorporated within the controller 110 and can operate as a color change component/module 180 of controller 110. Color change component (or module) 180 then receives a signal 210 from processor subsystem 112, which is the component within controller 110 that performs all of the prior determinations of the context and whether a change in the material color is required, based on received sensor inputs and the determined context. This signal 210 can, in some embodiments, be considered or defined to be the device-generated trigger, as the signal 210 automatically triggers material color change component/module 180 to implement processes that result in modifying the color of the external surface material. Thus, controller 110, acting via color change component/module 180, provides the device-generated trigger 215, which is transmitted to the visual characteristics changing elements 194 that cause the change in the color of the external surface material.

According to one or more embodiments and as illustrated by the figure, the modification of the exterior color of rear panel material (192) can be based on the rear panel being manufactured with material color changing elements 194a-194e embedded in, integrated into, or affixed to an interior section of rear panel 192. Each different material color changing element 194a-194e can respond to a specific one of the device-generated or device-applied triggers 215. In one or more alternate embodiments, a single material color changing element is provided for the entire rear panel and activation of the single material color changing element (194) can then cause the entire surface of the rear panel material to change to the second color.

FIG. 2B presents an alternate embodiment in which the surface changing elements 194a-194e are a part of the internal circuitry of the electronic device 200B. The rear panel 192 is manufactured with a composite material that has specific qualities which results in the change in the color of the external surface of the rear panel whenever a specific trigger is applied to, on, or in proximity to the internal surface of the rear panel 192b. With this embodiment, different types of rear panels having different characteristics can be added to the electronic device to provide different responses to the applied triggers.

Electronic device 200 includes at least one sensor that can detect a monitored context of the electronic device or the electronic device user. According to one or more embodiments, context sensors 160 can include one or more device orientation and position sensor(s) 162 from among an accelerometer, a gyroscope, a gyrometer, and an on-body detection sensor. As also presented, one or more embodiments provide that the device's image capturing devices (ICDs) 146 can be included within and utilized as one of orientation and position sensors 162. Context sensors 160 can also include a proximity or on-body sensor 202, for detecting when the electronic device is being carried (e.g., in pocket) or held by the user, which also indicates that the device is not in the first orientation. Context sensors 160 can also include external sensors that are communicatively connected to electronic device 200. The external sensors include user wearable devices 199, which can include physiological sensors 250 and biological sensing sensors 252. The external sensors can also include UWB tags or transmitters 198, as introduced in FIG. 1. It is appreciated that the specific sensors used and manner in which each can be used to determine the orientation and/or context of the electronic device or electronic device user can vary from each device.

Different sensors and/or combinations of sensors can be supported, in other embodiments.

The above figures present an electronic device 100/200 that includes an external panel 192 comprised of a material having an exterior visual characteristic that can be dynamically changed by a device-generated trigger 210/215. The external panel 192 is opposed to a primary notification interface of the electronic device, i.e., the primary display 152. The electronic device 100/200 also includes at least one orientation sensor (motion/position sensors 165) that detects when the electronic device is in a first orientation among a plurality of device orientations, the first orientation enabling the external panel 192 to be visible to the device user. The electronic device 100/200 includes a controller 110 communicatively coupled to the at least one orientation sensor (165) and which receives an input corresponding to a first context, the first context being pre-identified as a condition that triggers a change in the exterior visual characteristic of the material. The controller 110 identifies from sensor input received from the orientation sensor (165) whether the electronic device 100/200 is in the first orientation. In response to the electronic device 100/200 being in the first orientation, concurrently with receiving the input corresponding to the first context, the controller 110 generates and transmits a change activation signal 210 that results in a change in the exterior visual characteristic of the material from a first visible state to a second visible state. In one or more embodiments, the exterior visual characteristic is an exterior color of the material, the first visible state is a first color and the second visible state is a second, different color.

In one or more embodiments, the controller is communicatively coupled to a material color changing element 194 of the external panel 192, and the change activation signal is the device-generated trigger. In one or more alternate embodiments, the electronic device further includes a component 180 communicatively coupled to the controller 110 (or integrated within the controller) and to a change element 194 of the external panel 192. The component 180 receives the color change activation signal 210 and generates and transmits the device-generated trigger 215 to the change element 194. The device-generated trigger 215 can provide application of at least one of a voltage, a pressure, a current, a temperature, or a humidity to the material. Also, in one or more embodiments, an amount of relative change in the exterior visual characteristic of the material can be determined by a corresponding level of the at least one of voltage, pressure, current, temperature, or humidity applied to the material.

In one or more embodiments, the trigger generating component 180 can include circuitry for selection of a specific one of the device-generated triggers 215 based on the received control input/signal 210. As an example, to support application of a current or voltage or temperature (heat) as the trigger, the component 180 can include a voltage/current/temperature regulator 220. The component 180 applies a particular voltage or current to the rear panel to cause the current/voltage/temperature characteristics of the rear panel material to change, resulting in the change in the surface color of the material. The temperature change can be generated via a temperature change unit 225, which in one embodiment can be a heat generating component, such as a resistor, placed proximate to the interior of the rear panel 192 and receiving an applied current or voltage, which causes an increase in the temperature of the heat generating component.

In one or more embodiments, the trigger generating component 180 includes multiple sub-components that each correspond to a different one of the color change elements 194a-194e. Also, each different device-generated trigger produces a different change in the color of the material. Accordingly, in one or more embodiments, the processor selects which one of the multiple sub-components is utilized, based on the current context of the device and an amount and type of change desired for the color of the material, and the processor encodes the selection in the control signal 210 transmitted to the trigger generating component.

According to one embodiment, the processing of the received sensor input 205 and determinations related to changing the rear panel color are performed by a dedicated artificial intelligence (AI) engine 114 within or associated with processor subsystem 112. AI engine 114 can utilize empirical and other data to evaluate the received sensor inputs 205 and determine if the current context is one that falls in the category of monitored contexts for triggering a color change. AI engine 114 can also utilize configurable casing data 138 to decide which parameter signal 210 is required to cause the desired modification in the rear panel surface material color to present/represent the particular notification desired. AI engine 114 generates a corresponding control input 210 that is sent to the color change component 180 to cause the component 180 to provide the correct trigger 215. It is appreciated that these features can be performed by the processor subsystem 112 using program code stored in memory 120. Examples of program code include CCC Module 126, which can include a context color changing selection module 127 that utilizes the configurable casing data 138 in making the determination of which trigger to provide.

Figure 3A:
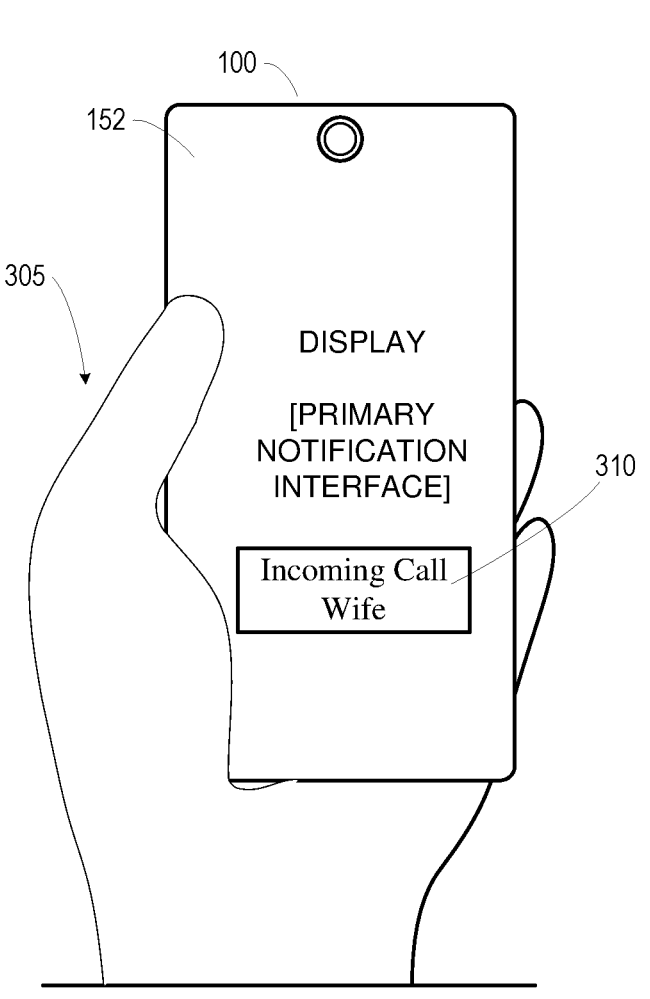
FIG. 3A presents a front view of the electronic device with the front surface being a display device that provides the user interface at which notifications are primarily presented when the display device is facing the user, according to multiple embodiments.
Figure 3B:
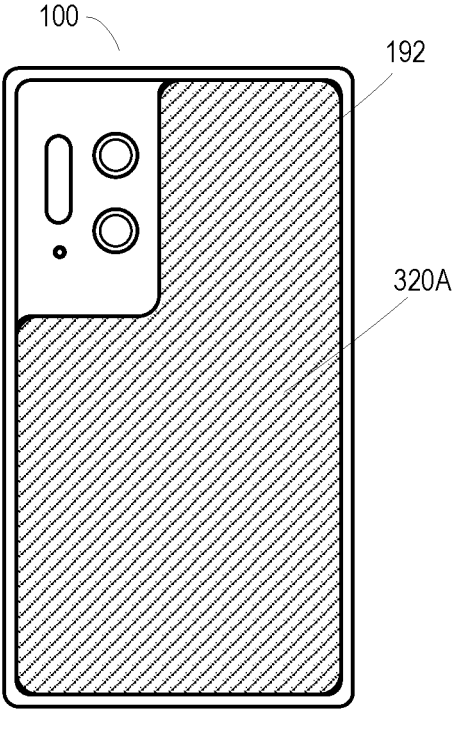
FIGS. 3B-3C present a rear view of the electronic device with a rear surface having an exterior color that changes from a first color in FIG. 3B to a second, different color in FIG. 3C, according to one or more embodiments.
Figure 3C:

According to one or more embodiment, the material of the at least one external surface (192) is changeable into multiple different colors each triggered by one of multiple device-generated triggers 215 that is provided by the component 180, a selected trigger among the multiple device-generated triggers being identified by the controller 110 based on the detected or determined context. The controller thus transmits a corresponding trigger-identifying signal 210 to trigger generating component 180 to provide the selected trigger 215 and cause the change of the color of the material to a specific one of the multiple different colors. While described as having multiple different colors, it is appreciated that one or more embodiments may provide for only a single change of the color of the material or a partial change of only a portion of the rear panel. In this scenario, the determination of the trigger is a singular decision of whether or not the context warrants a change from the original color to the single second color supported by the material. FIGS. 3A and 3B-3C illustrate an example of this single-color change implementation. Referring to FIG. 3A, there is presented a front view of the electronic device with the front surface being a display device that provides the primary user (notification) interface at which notifications are primarily presented when the display device is powered on and facing the user, according to multiple embodiments. In the illustration, user device 100 is being held in the user's hands 305, and device presents a notification 310 of an incoming call from the wife of the user.

FIGS. 3B-3C present a rear view of the electronic device 100 with a rear surface 192 having an exterior color that changes from a first color in FIG. 3B to a second, different color in FIG. 3C, according to one or more embodiments. As shown in FIG. 3B, rear surface 192 has first color 320A represented by the diagonally striped lines. Based on a detected or determined context, rear surface 192 is changed in FIG. 3C to another, second color 320B indicated by the pattern shown in the figure.

According to one or more embodiment, the first context is associated with one of the device and a user of the device. The first context is one context among a group of pre-set contexts that includes: device notification of an event; receipt of a communication from a pre-authorized contact; receipt of a contextual signal from a connected user wearable device; identifying an physical look (ambience) of a current location; a current location signal identifying the electronic device is in a particular type of location; detecting an emotional state of a user; detecting a physiological condition of a user; and detecting threshold-crossing updates to a value of a device parameter being tracked. It is assumed that each context is separately monitored for and can be detected independent of the other contexts. In one or more embodiments, the device user establishes which context(s) are to be monitored and visually alerted to the user using the changes in color of the external rear panel material.

FIG. 4 presents a table illustrating example mappings between different categories of detected or determined contexts and associated sensor inputs/triggers that cause the changes in the color of the exterior material of the rear panel of the electronic device, according to a plurality of embodiments. The example columns of the table 400 include category of contexts, which includes separate context for biological and physiological context, do-not-disturb (DND) context, location and (visual) ambiance context, device parameter context, and location to other devices (or identify my device) context. Each context has specific types of sensor/trigger inputs (i.e., sensed conditions) that are used as the inputs, which controller utilizes to determine when or whether to trigger the color change of the rear panel. For example, for the DND context, the input can be notifications, incoming communications, where the user has pre-set certain types of notifications and/or communication from certain pre-approved persons/contacts as the contextual trigger condition. The specific contexts are identified in context column. For each context, a value or range and/or a threshold can be established. For example, an elevated heartrate context can be triggered when the heart rate exceeds 80 beats per minute over a period of time, while the user is stationary (not exercising). The exterior color column assigns particular colors to the different contexts, and can be set and/or modified by the user. For example, a selections user interface of CCC module 126 (FIG. 1) can be provided to enable the user to make/input the selections. The duration column identifies specific limits for certain of the color changes, such that the color change can be temporary. In one or more embodiments, a settings options can be provided to allow the color change to revert back to the original rear panel color in response to a sensed touch of the rear panel by the user. As an example, with the example scenario illustrated by FIGS. 6A-6B, the device's color change will remain until the device is actually picked up the device user. The controller performs a user authentication using biometrics (e.g., facial recognition or fingerprint) or passcode entry to confirm that the correct user has picked up the device.

According to one or more embodiments, the first context corresponds to a stress level of the user. The controller 110 receives an indication of a current stress level of the device user. In one or more embodiments, the electronic device 100 can be coupled to one or more user wearable devices 195 that monitors biological and/or physiologic information detected from the user using the device. The information can be raw data, such as heart beats per minute or other sensed data that can be correlated by the device processor with the user's current stress level. The processor thus can determine the user's current stress level based on the received data, using one or more stored baseline data of the user. The baseline data can be monitored data from previous periods of activity and/or stress. The baseline data can also be heuristically determined, retrieved from a remote database or other device, or entered as a range of values by the user. In response to the current stress level being above a pre-established threshold, the controller selects and presents a specific change to the exterior visual characteristic of the material that promotes a reduction in the current stress level of the device user. As an example, where the user's favorite color is blue and/or the color blue soothes or calms the user down when the user is in an excited state, the controller or AI can determine the context of the user being stresses, identify the need to calm the user down, and trigger the change of the exterior material color to a blue color.

In one or more embodiments, the first context includes receipt of a signal from a connected user wearable device providing at least one of an emotional state of the device user and a physiological state of the device user. The controller 110, in response to detecting a monitored one of the emotional state and the physiological state of the user being outside a normal range of a respective emotional state or physiological state, modifies the exterior visual characteristic to the second visible state that visually indicates a current value of the monitored one of the emotional state and physiological state. According to one embodiment, the controller reverts the exterior visual characteristic to the first visible state, in response to the current value of the monitored one of the emotional state and physiological state returning to within the normal range. Implementation of the embodiments can be extended to monitoring brainwaves using a wearable probe and using a known pattern of recorded brainwaves when the user is in a normal state to identify whether the change in color is to be triggered. A blood pressure or heart rate or pulse reading can similarly be compared to a pre-determined range of normal readings to identify whether the change in color is to be triggered. Where multiple different readings from different physiological of biological conditions are being monitored, embodiments can be provided in which a different color is provided for each different condition being monitored such that the user is made aware of which condition is out of range.

In one or more embodiments, the electronic device 100 is a communication device and first context corresponds to receipt of a communication from a first pre-approved contact among a plurality of contacts, whose contact details are stored in a contacts listing or contacts database. The contact details can include phone and/or email contact details stored in a contacts database accessible to the electronic device, where the contacts database can be locally stored on the electronic device or maintained at a remote repository. The user of the device pre-approves certain contacts to bypass a do-not-disturb setting of the device, so that the user is notified whenever a communication originating from that pre-approved person (identified via a corresponding contact) is received. The pre-approval of the contact can be via a "bypass DND" setting established within the contact when the contact is being set-up or by later editing of an existing contact. In one or more embodiments, the bypass DND setting can also include a selection of a color to assign to the particular contact, similar to assigning a unique ring tone to a contact. The controller determines that the electronic device is in a do-not-disturb mode, in which an audible ringer of the device is turned off, and the controller transmits the change activation signal further in response to the electronic device being in the do-not-disturb mode. The controller generates a first change activation signal that modifies the external surface material to present the second visible state, in response to receiving the communication from the first pre-authorized contact while the electronic device is in the do-not-disturb mode. When a communication is received from another contact who is not in a pre-approved list of contacts, no notification is provided of the received communication and no change of color is made to the rear panel.

Additionally, in one or more embodiments, a second pre-approved contact is associated with a second context that is associated with a third visible state of the material, and the controller generates a second change activation signal that modifies the external surface material to present a third visible state, in response to receiving a second communication from the second pre-approved contact.

In one or more embodiments, the first context includes one of (i) identifying an ambiance of a current location and (ii) receipt of a current location signal, which indicates the electronic device 100 is in a particular type of location. The current location signal can be via a GPS signal, in one embodiment and/or WiFi location identification, in another embodiment. Identifying an ambiance of the current location can be via an exposed ICD capturing an image of the field of view of the environment surrounding the electronic device. The ambiance can also be identified by identifying the precise location at which the device is and mapping the location to published information about the particular location available via the Internet or wireless network. The controller 110, in response to identifying at least one of the ambiance and the type of location, selects, from among multiple available color characteristics, including brightness, a specific color characteristic that aligns with a theme of the identified ambiance or location type, the specific color characteristics being a part of the second visible state. The controller 110 then triggers the change in the external visual characteristics of the material to the second visible state, which presents the selected specific color characteristic.

In one or more embodiments, the first context includes identifying that a value of a device parameter being tracked has passed a pre-established threshold value. The controller 110 monitors a current value of the device parameter and, in response to the current value being outside the pre-established threshold value, triggers the change in the exterior visible characteristic of the material. As an example, a user may set specific limits on screen time used for a particular application or feature on the electronic device. The user may set a limit of 2 hours in a 24-hour period for use of a social media account, such as X or IG or for actively interfacing with the display of the electronic device (i.e., screen time). As another example, the user may set a remaining battery power parameter with a pre-established threshold value of 20% remaining to trigger the visual notification via the color change.

According to one or more embodiments, the color of the rear panel material can also be gradually adjusted as the track parameter changes value (increases or decreases). Thus, with the first example for screentime usage, the exterior color may begin with white for zero (0) screen time used and gradually change to red (via different shades of off-white and pink) as the screen time approaches the 2-hour time limit.

According to one or more embodiments, the first orientation includes the electronic device 100 being positioned with the primary notification interface on a support surface with the external panel located on an opposed side of the electronic device away from the support surface and visible. Also, the first context includes a detected presence of at least one second user device within proximity of the electronic device 100. As an example, the at least one second user device can be a user wearable device or a UWB device that is communicatively connected to the electronic device 100. The controller 110 changes the exterior visual characteristic to the second visible state that includes a unique visual state that is distinguishable from a base state of the at least one second user device, in response to detecting the presence of the at least one second user device, while the electronic device is located within proximity of the at least one second electronic device.

Figures 5A, 5B, 5C, 5D:
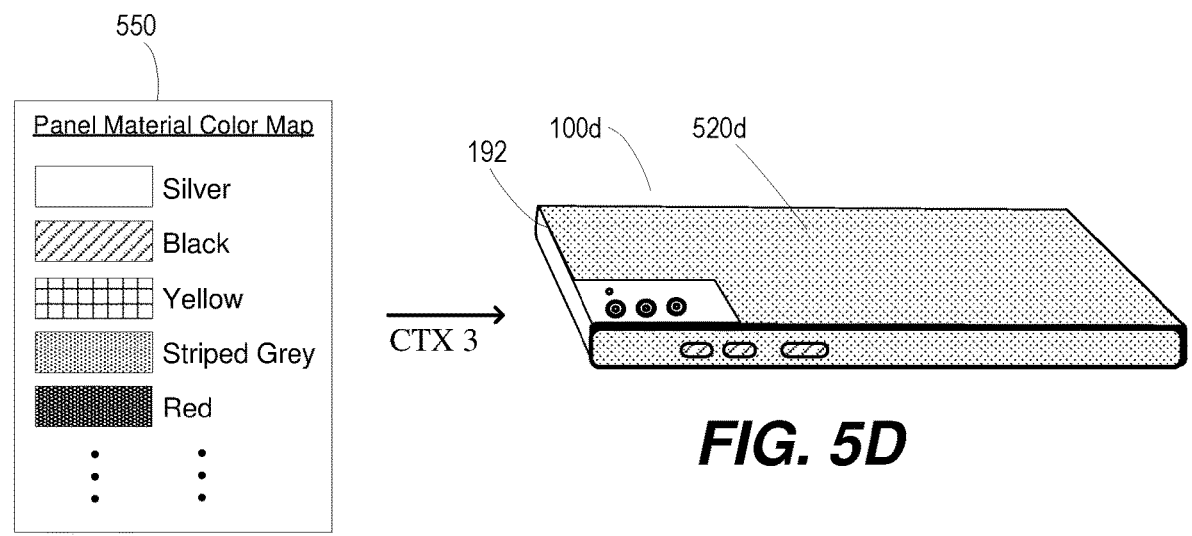
FIGS. 5A-5D present the electronic device with the rear surface material transitioning from a first color to one or three different, second colors, each based on a different one of a detected or determined context, according to one or more embodiments.

FIGS. 5A-5H presents several different example views of the rear panel of electronic device with different colors and/or patterns dynamically programmed by the controller based on the monitored context while the rear panel is visible to the device user, according to multiple embodiments. Specifically, FIGS. 5A-5D presents the electronic device with the rear surface material transitioning from a first color to three different, second colors, each based on a different one of a detected or determined context, according to a plurality of embodiments. FIGS. 5E-5H then present alternate modes of changing color of the rear surface material, including partial and segmented application of color changes instead of a complete change of the entire rear surface to a single color, according to a plurality of embodiments;

Beginning with FIG. 5A, electronic device 100a is presented as a smart phone having an exterior housing that consists of a display 152 on the front side of the device 100a and a rear panel 192 on a back side of the device 100a. Electronic device 100 includes adjoining side panels, with one side panel having volume control buttons 505a-505b and a control/power button 506, which can be used to power the device on/off, place the device in sleep or active mode, or control a feature or function of the device, such as taking a picture. Rear surface 192 of electronic device includes image capturing devices 515 located at a top corner of the rear surface, separate from the rear panel 192. Rear panel 192 is shown with the exterior material presented in a first (standard/base) color 520a, in which the surface material appears white. The different colors described within the various embodiments are represented herein using shading patterns, where each shading pattern represents a different color, as shown in the color index table 550 to the bottom left of the page.

FIG. 5B presents a second embodiment of electronic device 100b in which the color of the material of rear panel 192 has been changed to present a second color 520b. As provided by color index table 550, the second color 520b is blue. FIG. 5C presents a third embodiment of electronic device 100c in which the color of the material of rear panel 192 has been changed to present a different second color 520c. As provided by color index table 550, the second color 520c is black. FIG. 5D presents a fourth embodiment of electronic device 100d in which the material color of rear panel 192 has been changed to present another second color 520d. As provided by color index table 550, the other second color 520d is grey. The different colors or rear panel 192 presented by FIGS. 5A-5D and within color index table 550 are example colors and not meant to limit the type, hue, or visual characteristics of the color that can be applied to the rear panel material. In one or more embodiments, each of the second, third, and fourth colors 520b, 520c, 520d are temporarily triggered in response to the device controller (or AI engine) determining that the particular color provides the required notification or alert to the device user of a specific context associated with the device or the device user, as detected by the sensors or determined by the controller of electronic device. Also, as presented within the illustrative embodiments, each of the particular color change can be triggered using specific control signals or triggers, including a respective first, second, and third control signal or trigger, CTX 1, CTX2, and CTX 3. Further, according to one or more embodiments, the controller removes or reverses the color change activation trigger when the context changes back to a normal context, in order to cause the electronic device to revert the rear panel material back to the first color 520*a*.

In one or more embodiments, the controller receives an updated context and evaluates whether the updated context of the device still requires the color to be applied to the external surface material for the electronic device. In response to receiving the updated context and determining that the added color is no longer required, the controller generates and transmits a second signal to the component 180 to cause the component to change the color of the material back to a base or first color (420*a*). In one embodiment, the component 180 provides a fourth device-generated trigger causing a reverse change in the color of the material to the first (original) color 520*a*. Alternatively, in one or more embodiments, the component 180 removes the application of the first device generated trigger, which removal causes the reverse change in color of the material to the first color (320*a*).

Referring now to FIGS. 5E-5H and with ongoing reference to FIGS. 1 and 2A-2B, in one or more embodiments, each of the color change elements 194 (FIG. 1) can be located in/at an assigned section/location of the rear panel 192. Also, in one or more embodiments, each of the color change elements 194 can provide a different color change to the assigned section of the rear panel 192, such that a different visible change can be presented to the user at particular sections of the rear panel. These embodiments enable the controller to provide different signals to each color change element, resulting in presentation of a regular or an irregular pattern, such as a striped pattern or a geometric or dotted pattern of colors on the exterior material. FIG. 5E illustrates a striped pattern 520*e* triggered based on receipt of the third control signal or trigger, CTX 3. In the illustrated embodiment, the striped pattern is provided by alternating two colors; However, in other embodiments, the striped pattern can be provided using different, distinct colors for each stripe 525. Notably, in this example, the color change extends across the entire surface of the rear panel of electronic device 100*e*. In contrast, according to one or more embodiments, FIGS. 5F-5H illustrate sectioned application of color changes, where the color change occurs or is applied to only a specific section of the rear panel 192. In each of these examples, the rear panel has been sectioned into areas that correspond to specific types of visual notifications associated with different contexts. FIG. 5F illustrates application of the color change 520*f* to a lower rectangular section 530 of the rear panel 192 of electronic device 100*f* in response to receipt of a first control signal or trigger, CTX 1. As an example, the color change in the lower rectangular section 530 can be used to signal to the user that the user's heart rate is elevated, based on receipt of a biometric signal from a user wearable device. FIG. 5G illustrates application of the color change 520*g* to a middle lower region of the rear panel 192 of electronic device 100*g* as colored segments of a status bar 535, in response to receipt of a fourth control signal or trigger, CTX 5. As an example implementation, the color status bar 535 can be presented periodically to show the screen time used for a particular application on the device. As another example implementation, the color status bar 535 can be triggered when a battery level of the device is at 20% or below, as a notification to the user that the device should be charged.

As a final illustrative embodiment, FIG. 5H illustrates application of a plurality of different color changes to different segments of the rear panel of electronic device 100*h*. In this embodiment, the top section of the rear panel has been sectioned to provide a color change 520*f* in a circle outline 540, which can indicate receipt of an incoming communication from a pre-approved contact. Additionally, the particular color of the circle outline 540 can also identify from which contact among multiple pre-approved contacts the communication originates. Changes to the color of multiple different sections of the rear panel are presented in response to receipt of a corresponding set of first, fourth, and fifth control signals or triggers, CTX 1, CTX 4, and CTX 5. While the different color changes 520*h* are illustrated as overlapping in time, it is appreciated that the timing at which each color change is triggered can vary and that the length of time each remains at the presented color can also vary, as explained with the examples with table 500 (FIG. 5).

Figure 6A:
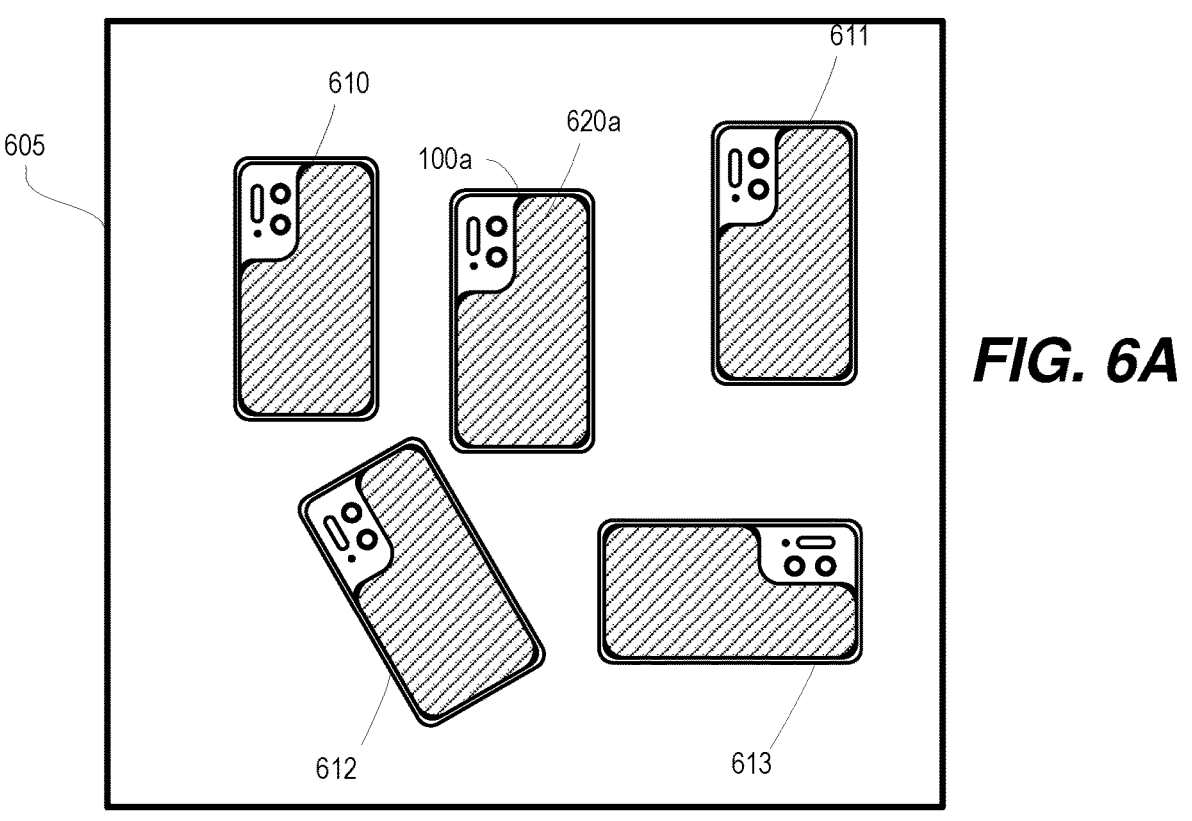
FIGS. 6A-6B illustrate an example scenario of the electronic device being collocated on a surface with a plurality of other devices and being triggered to change the color of the exterior surface of the rear panel to enable the user to identify the electronic device, according to one or more embodiments.
Figure 6B:
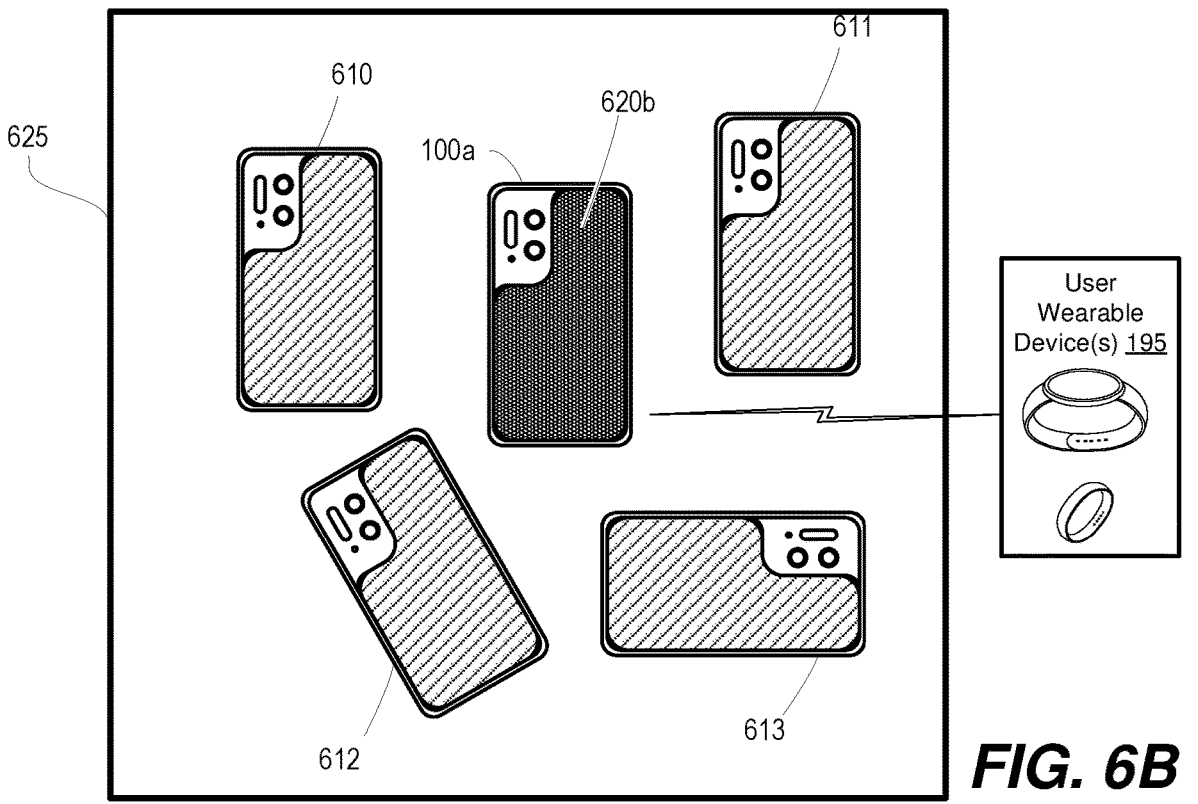

FIGS. 6A-6B illustrates an example scenario of the electronic device 100*a* being collocated on a surface with a plurality of other similar devices 610-613 and being triggered to change the normal color 620*a* of the exterior surface of the rear panel to a second color 620*b* to enable the user to identify the electronic device, according to one or more embodiments. As shown by FIG. 6A, each of a plurality of devices 100*a*, 610, 611, 612, and 613 are collocated with each other on a surface 605 and facing down to expose a similarly colored rear panel (e.g., black) 620*a*. As presented by FIG. 6B, the user's electronic device 100*a* is communicatively connected to a user wearable device or UWB tag 195. As the user approaches the area with the devices, the controller senses a communication link (connection) to the user's user wearable device 195 (or UWB). In response, the controller generates or initiates generation by the component of the device-generated trigger to cause the rear panel of the user's electronic device 100*a* to change to a second color (e.g., red), which distinguishes the electronic device 100*a* from the second devices 610-613. It is appreciated the color changing features described that are triggered by the detected presence of a user wearable device of UWB tag can be applied independent of the presence of similar colored second devices. The features described can support locating a device when placed face down on any surface whether or not surrounded by similar devices. Thus, a phone with a black exterior casing that is placed on a black or dark surface can be made to change its color to yellow or red as the user approaches the general location to enable the user to more quickly locate the phone.

Additional configurations of the electronic device are supported in one or more alternate embodiments. In another embodiment, the electronic device includes a device housing that encompasses the controller and other functional components and to which the at least one external surface is removably attached. With this embodiment, the device further includes a connection interface that electrically couples the component with the controller, the component being a part of the at least one external surface. FIG. 7A-7C illustrate an example exterior casing with embedded electronics that enables a linked portable device to which the casing is attached to trigger dynamic changing of the color of the exterior material of the casing, in response to device-sensed or device-determined contexts, according to one or more embodiments. According to one additional aspect of the disclosure, which is illustrated by FIGS. 7A-7C, an electronic device casing cover 700 is provided that includes an exterior material having a configurable color that can be changed based on a received device-provided trigger generated in response to a detected context of an electronic device 100 on which the electronic device cover is placed. Similar to the previously examples with the integrated rear panel, the received device-provided trigger 720 causes a change in at least one of a voltage, a pressure, a current, a temperature, or a humidity applied to the exterior casing material by the electronic device 100 in response to the detected context. As shown with FIG. 7A, the exterior casing cover 700 includes a rear surface 705 with integrated elements 794 that cause the changes in the exterior surface of the casing material. The exterior casing cover 700 also includes an integrated circuit (or electronics) 710 which may be configured with a communication receiving device, such as a Bluetooth receiver for receiving the device-generated trigger from a transmitter device 715, such as a BT transmitter, of trigger generating component 180. With the ability to provide the functionality within an off-the-shelf casing, multiple different types of casing can be provisioned to provide different types of color changes based on the receipt of the device-generated triggers. FIG. 7B illustrates the exterior casing cover 700 positioned to be affixed to a rear surface of electronic device 100, with the device transmitter (715) and receiver module (710) in proximity to each other. FIG. 7C presents a block diagram of the device components with internal sensors 160 and with controller 110 having trigger generating (or color change) component 180 that includes the transmitter 715. Electronic device 100 includes rear panel 192 of device casing. External casing cover 700 is positioned to be placed over the rear panel 192 in the direction of the dotted arrows, aligning receiver (710) with transmitter 715 to enable wireless communication of color change signal 720 from device controller 110 to external casing cover 700.

Accordingly, one additional aspect of the disclosure provides an electronic device cover that includes an exterior material having a configurable color that can be changed based on a received device-provided trigger generated in response to a detected context of an electronic device on which the electronic device cover is placed. In one embodiment, the received device-provided trigger corresponds to a change in at least one of a voltage, a pressure, a current, a temperature, or a humidity being applied to the exterior casing material by the electronic device in response to the detected context. In an alternate embodiment, the electronic device cover includes electronics for: communicatively coupling the cover to the controller of the electronic device to which the cover is attached; receiving the device-provided signal from the controller of the electronic device, via a transmitter; and triggering the change in the material color on receipt of the device-provided signal. The controller of the electronic device is communicatively connected to a transmitter that is paired to the electronics embedded in the electronic device cover.

Figure 8:
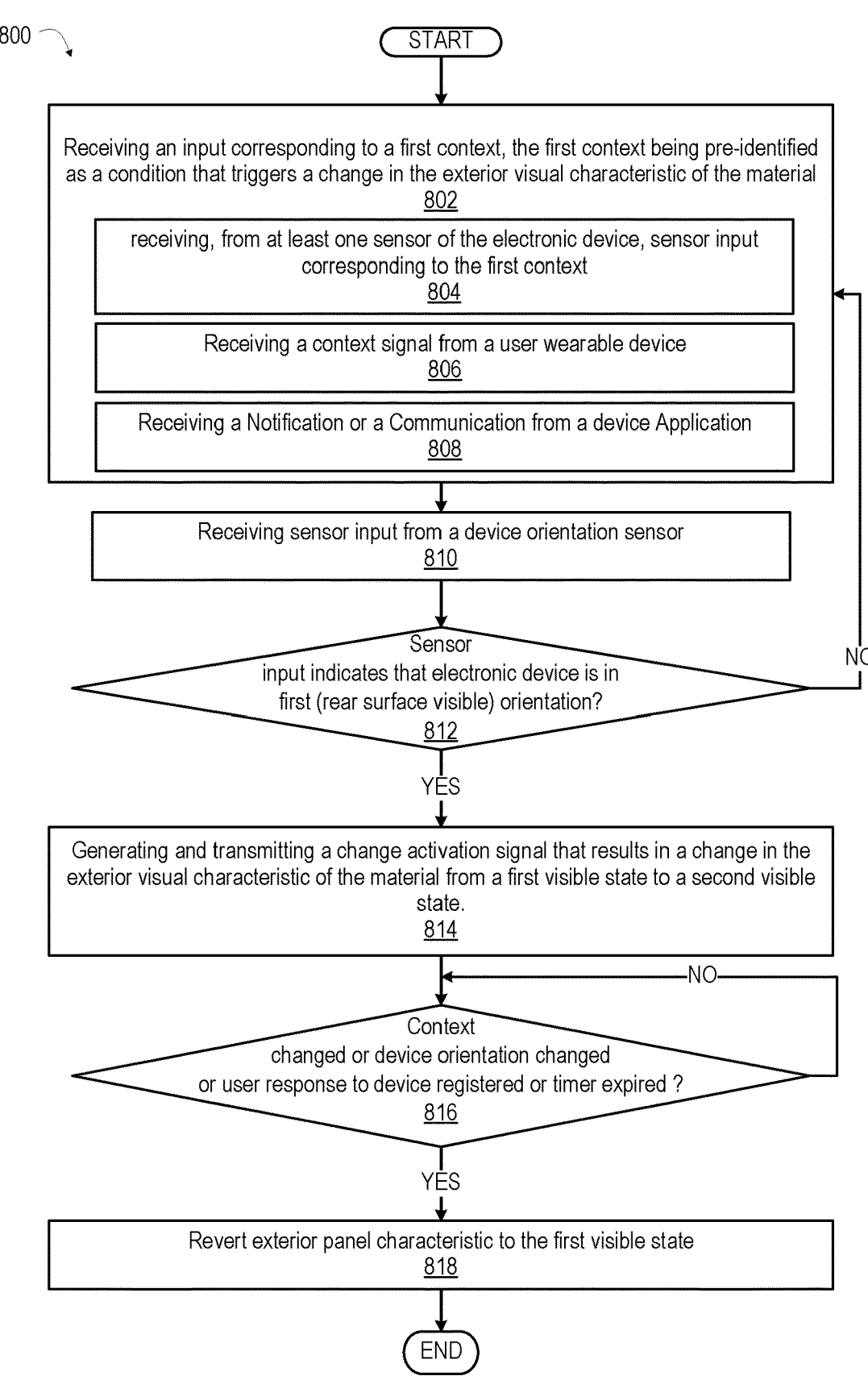
FIG. 8 is a flow diagram presenting a method performed by a portable electronic device for dynamically modifying the exterior color of the material of a rear panel in response to a detected or determined context, according to one or more embodiments.
Figure 9:
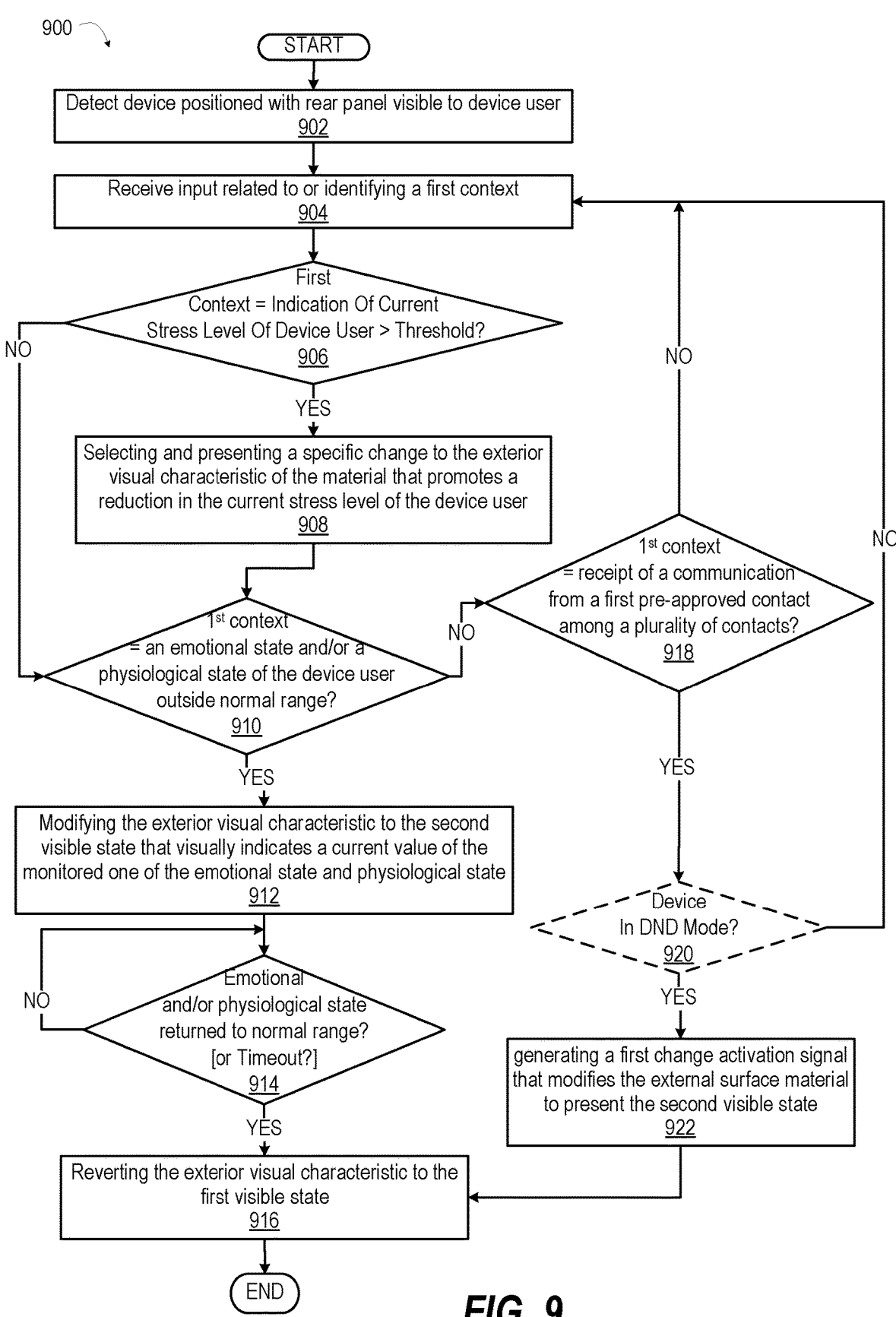
FIG. 9 is a flow diagram presenting additional aspects of a method performed by the portable electronic device for dynamically modifying exterior color of the material based on sensing or determining different types of context, according to one or more embodiments.

With reference now to the flowcharts, FIG. 8 is a flow diagram presenting a method performed by a portable electronic device for dynamically modifying the exterior color of the material of a rear panel in response to a detected or determined context, according to one or more embodiments. FIG. 9 is a flow diagram presenting additional aspects of a method performed by the portable electronic device for dynamically modifying exterior color of the material based on sensing or determining different types of context, according to one or more embodiments. The descriptions of methods 800 and 900 are provided with general reference to the specific components illustrated within the preceding FIG. 1-FIG. 7C. Specific components referenced in methods 800 and method 900 may be identical or similar to components of the same name used in describing preceding FIGS. 1-7C. In one or more embodiments, controller 110 (FIG. 1) configures electronic device 100 (FIG. 1) or a similar computing device to provide the described functionality of methods 800 and 900. Both methods 800 and 900 are implemented within an electronic device having an external panel comprised of a material having an exterior visual characteristic that can be dynamically changed by a device-generated trigger.

With reference to FIG. 8, following the start block, method 800 includes receiving, by a controller of the electronic device, an input corresponding to a first context, the first context being pre-identified as a condition that triggers a change in the exterior visual characteristic of the material (block 802). According to one or more embodiments, the receiving of the input can include one or more of: receiving, from at least one sensor of the electronic device, sensor input corresponding to the first context (block 804); receiving a context signal from a user wearable device (block 806); and receiving a notification or a communication from a device application (block 808). Method 800 includes receiving or retrieving sensor input from a device orientation sensor (block 810) and determining, at decision block 812, whether sensor input indicates that electronic device is in the first orientation (i.e., positioned with the display faced down on a surface or positioned such that the rear panel is visible to the device user). Specifically, method 800 includes identifying from sensor input received from an orientation sensor whether the electronic device is in the first orientation. In response to the orientation sensor indicating that the device is not in the first orientation, method 800 returns to block 802. In response to the orientation sensor input indicating that the electronic device is in the first orientation and concurrently with receiving the input corresponding to the first context, method 800 includes generating and transmitting a change activation signal that results in a change in the exterior visual characteristic (e.g., color) of the material from a first visible state to a second visible state (block 814). In one or more embodiments, the exterior visual characteristic is an exterior color of the material, the first visible state is a first color and the second visible state is a second, different color.

Method 800 then includes determining or checking, at decision block 816, whether one or more conditions have occurred from among (i) the context has changed to no longer require the color change or (ii) the device orientation has changed so the exterior rear panel is no longer visible to the user or the primary display device is visible to the user or (iii) a user response to pick up or interface with the device is registered, and the user interfacing with or paying attention to the primary user interface stops the displaying of the second color or (iv) a preset timer for displaying the second color has expired. In response to one or more of the conditions having occurred, method 800 transitions to block 818 which includes reverting the rear panel's visible characteristics to the first visible state. Then, method 800 ends.

According to one or more embodiments, the material of the at least one external surface is changeable into multiple different colors each triggered by one of multiple device-generated triggers that is provided by the component, a selected trigger among the multiple device-generated triggers being identified by the controller based on characteristics of the detected or determined context. Method 800 includes transmitting a corresponding trigger-identifying signal to the component to provide the selected signal that causes the change of the color of the material to a specific one of the multiple different colors.

According to one or more embodiments, the device-generated trigger comprises application of at least one of a voltage, a pressure, a current, a temperature, or a humidity to the material. Also, an amount of relative change in the color of the material is determined by the corresponding level of the voltage, pressure, current, temperature, or humidity applied to the material. Method 800 includes determining the corresponding level of the voltage, pressure, current, temperature, or humidity to be applied to the material, based on the detected or determined context of the electronic device or electronic device user and the amount of relative change required for that context value (e.g., within a range of values). Method 800 includes applying the corresponding level of the voltage, pressure, current, temperature, or humidity to the material.

According to one or more embodiments, the first context is associated with one of the device and a user of the device. Specifically, the first context is one of a group of pre-set contexts that includes: device notification of an event; receipt of a communication from a pre-authorized contact; receipt of a contextual signal from a connected user wearable device; identifying an ambience of a current location; a current location signal identifying the electronic device is in a particular type of location; detecting an emotional state of a user; detecting a physiological condition of a user; and detecting threshold-crossing updates to a value of a device parameter being tracked. FIG. 9 presents an example sequence by which the controller identifies which of a plurality of different contexts are triggered and responds accordingly.

Referring now to FIG. 9, from the start block, method 900 transitions to block 902 which includes the controller detecting that the device is positioned with the rear panel visible to the device user (i.e., in the first orientation). Method 900 includes receiving input related to or identifying a first context (block 904). In one embodiment, the first context corresponds to a stress level of the user and so method 900 includes receiving an indication of a current stress level of the device user. Method 900 includes determining, at decision block 906, if the current stress level of the device user is above a threshold level. In response to the current stress level being above a pre-established threshold, selecting and presenting a specific change to the exterior visual characteristic of the material that promotes a reduction in the current stress level of the device user (block 908).

In one embodiment, the first context includes receipt of a signal providing at least one of an emotional state of the device user and a physiological state of the device user. Following block 908 or in response to a no output from decision block 906, method includes determining, at block 910, whether the first context involves detecting a monitored one of the emotional state and the physiological state of the user being outside a normal range of a respective emotional state or physiological state. In response to detecting a monitored one of the emotional state and the physiological state of the user being outside a normal range of a respective emotional state or physiological state, method 900 includes modifying the exterior visual characteristic to the second visible state that visually indicates a current value of the monitored one of the emotional state and physiological state (block 912). Method 900 includes periodically checking the updated current values and determining at block 914 whether the emotional and/or physiological state of the device user has returned to a normal range. Alternatively, or in addition, the check can be the occurrent of a timeout condition, which assigns a specific amount of time for the color change to be presented, after the color change was initiated. In response to the current value of the monitored state returning to the normal range or after a timeout, method includes reverting the exterior visual characteristic to the first visible state (block 916). Method 900 then ends.

In one or more embodiments, the first context corresponds to receipt of a communication from a first pre-approved contact among a plurality of contacts. Returning to decision block 910, following the "NO" output from decision block 910, method 900 transitions to decision block 918 at which method 900 includes determining whether the first context corresponds to receipt of a communication from a first pre-approved contact among a plurality of contacts. In response to the first context being the receipt of a communication from the first pre-approved contact, method 900 optionally includes determining whether the electronic device is in a do-not-disturb (DND) mode in which an audible ringer of the device is turned off (block 920). According to one embodiment, the controller transmits the change activation signal further in response to the electronic device being in the do-not-disturb mode, as the notification about the communication would otherwise be outputted via a ring tone or haptic feedback, etc. that would alert the user without the need for a color change. The optionality of this determination is indicated by the dashed lines creating the decision box. In one or more alternate embodiments, the electronic device being in the DND mode is not a requirement or prerequisite for implementing the color change of the rear panel material. With these embodiments, the device user can utilize the color change to visually identify which particular one of multiple approved contacts the communication is originating from, without having to turn over the electronic device. Returning to the flow chart, in response to the DND being set or if the DND is not required, method 900 includes generating a first change activation signal that modifies the external surface material to present the second visible state, in response to receiving the communication from the first pre-authorized contact (optionally while the electronic device is in the do-not-disturb mode) (block 922). From block 922, method 900 transitions to block 916 or to end block.

According to one or more embodiments, a computer program product is also provided including a non-transitory computer readable storage device; and program code on the computer readable storage device that when executed by a processor associated with an electronic device having an external panel comprised of a material having an exterior visual characteristic that can be dynamically changed by a device-generated trigger, the program code enables the electronic device to provide functionality of the above described methods 800 and 900.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
an external panel comprised of a material having an exterior visual characteristic that can be dynamically changed by a device-generated trigger, the external panel opposed to a primary notification interface of the electronic device;
at least one orientation sensor that detects when the electronic device is in a first orientation among a plurality of device orientations, the first orientation enabling the external panel to be visible to a device user; and
a controller communicatively coupled to the at least one orientation sensor and which:
receives an input corresponding to a first context, the first context being pre-identified as a condition that triggers a change in the exterior visual characteristic of the material;
identifies from sensor input received from the at least one orientation sensor whether the electronic device is in the first orientation; and
in response to the electronic device being in the first orientation concurrently with receiving the input corresponding to the first context, generates and transmits a change activation signal that results in a change in the exterior visual characteristic of the material from a first visible state to a second visible state.

2. The electronic device of claim 1, wherein:
the exterior visual characteristic is an exterior color of the material; and
the first visible state is a first color and the second visible state is a second, different color.

3. The electronic device of claim 1, wherein the controller is communicatively coupled to a change element of the external panel and the change activation signal is the device-generated trigger.

4. The electronic device of claim 1, further comprising:
a component communicatively coupled to the controller and to a change element of the external panel, wherein the component receives the change activation signal and generates and transmits the device-generated trigger to the change element, wherein the device-generated trigger comprises application of at least one of a voltage, a pressure, a current, a temperature, or a humidity to the material, and wherein an amount of relative change in the exterior visual characteristic of the material is determined by a corresponding level of the at least one of the voltage, the pressure, the current, the temperature, or the humidity applied to the material.

5. The electronic device of claim 1, wherein:
the first context is associated with one of the electronic device and a user of the electronic device; and
the first context is one of a group of pre-set contexts comprising: device notification of an event; receipt of a communication from a pre-authorized contact; receipt of a contextual signal from a connected user wearable device; identifying an ambience of a current location; a current location signal identifying the electronic device is in a particular type of location; detecting an emotional state of a user; detecting a physiological condition of a user; and detecting threshold-crossing updates to a value of a device parameter being tracked.

6. The electronic device of claim 1, wherein the first context corresponds to a stress level of the device user, and the controller:
receives an indication of a current stress level of the device user; and
in response to the current stress level being above a pre-established threshold, selects and presents a specific change to the exterior visual characteristic of the material that promotes a reduction in the current stress level of the device user.

7. The electronic device of claim 1, wherein:
the first context comprises receipt of a signal from a connected user wearable device providing at least one of an emotional state of the device user and a physiological state of the device user; and the controller:

in response to detecting a monitored one of the emotional state and the physiological state of the device user being outside a normal range of a respective emotional state or physiological state, modifies the exterior visual characteristic to the second visible state that visually indicates a current value of the monitored one of the emotional state and physiological state; and reverts the exterior visual characteristic to the first visible state in response to the current value returning to within the normal range.

8. The electronic device of claim 1, wherein:

the first context corresponds to receipt of a communication from a first pre-approved contact among a plurality of contacts; and the controller:

determines that the electronic device is in a do-not-disturb mode in which an audible ringer of the device is turned off, wherein the controller transmits the change activation signal further in response to the electronic device being in the do-not-disturb mode; and generates a first change activation signal that modifies the external panel material to present the second visible state, in response to receiving the communication from the first pre-approved contact while the electronic device is in the do-not-disturb mode.

9. The electronic device of claim 8, wherein:

a second pre-approved contact is associated with a second context that is associated with a third visible state of the material; and the controller generates a second change activation signal that modifies the external panel material to present a third visible state, in response to receiving a second communication from the second pre-approved contact.

10. The electronic device of claim 1, wherein:

the first context comprises one of (i) identifying an ambiance of a current location and (ii) receipt of a current location signal, which indicates the electronic device is in a particular type of location; and the controller, in response to identifying at least one of the ambiance and the particular type of location:

selects, from among multiple available color characteristics, including brightness, a specific color characteristic that aligns with a theme of the identified ambiance or location type, the specific color characteristics being a part of the second visible state; and triggers the change in the exterior visual characteristics of the material to the second visible state, which presents the selected specific color characteristic.

11. The electronic device of claim 1, wherein:

the first context comprises a value of a device parameter being tracked passing a pre-established threshold value; and the controller:

monitors a current value of the device parameter; and in response to the current value being outside the pre-established threshold value, triggers the change in the exterior visible characteristic of the material.

12. The electronic device of claim 1, wherein the first orientation comprises the electronic device being positioned with the primary notification interface on a support surface with the external panel located on an opposed side of the electronic device away from the support surface and visible.

13. The electronic device of claim 12, wherein:

the first context comprises a detected presence of at least one second user device within proximity of the electronic device; and the controller: changes the exterior visual characteristic to the second visible state that comprises a unique visual state that is distinguishable from a base state of the at least one second user device, in response to detecting a presence of the at least one second user device while the electronic device is located within proximity of the at least one second electronic device.

14. A method comprising:

receiving, by a controller of an electronic device having an external panel comprised of a material having an exterior visual characteristic that can be dynamically changed by a device-generated trigger, an input corresponding to a first context, the first context being pre-identified as a condition that triggers a change in the exterior visual characteristic of the material;

identifying from sensor input received from an orientation sensor whether the electronic device is in a first orientation where the external panel is visible to a device user; and in response to the electronic device being in the first orientation concurrently with receiving the input corresponding to the first context, generating and transmitting a change activation signal that results in a change in the exterior visual characteristic of the material from a first visible state to a second visible state.

15. The method of claim 14, wherein:

the exterior visual characteristic is an exterior color of the material; and the first visible state is a first color and the second visible state is a second, different color.

16. The method of claim 14, wherein:

the first context is associated with one of the electronic device and a user of the electronic device; and the first context is one of a group of pre-set contexts comprising: device notification of an event; receipt of a communication from a pre-authorized contact; receipt of a contextual signal from a connected user wearable device; identifying an ambience of a current location; a current location signal identifying the electronic device is in a particular type of location; detecting an emotional state of a user; detecting a physiological condition of a user; and detecting threshold-crossing updates to a value of a device parameter being tracked.

17. The method of claim 14, wherein the first context corresponds to a stress level of the device user, and the method comprises:

receiving an indication of a current stress level of the device user; and in response to the current stress level being above a pre-established threshold, selecting and presenting a specific change to the exterior visual characteristic of the material that promotes a reduction in the current stress level of the device user.

18. The method of claim 14, wherein:

the first context comprises receipt of a signal providing at least one of an emotional state of the device user and a physiological state of the device user; and the method further comprises:

in response to detecting a monitored one of the emotional state and the physiological state of the device user being outside a normal range of a respective emotional state or physiological state, modifying the exterior visual characteristic to the second visible state that visually indicates a current value of the monitored one of the emotional state and physiological state; and reverting the exterior visual characteristic to the first visible state in response to the current value returning to within the normal range.

19. The method of claim 14, wherein:

the first context corresponds to receipt of a communication from a first pre-approved contact among a plurality of contacts; and the method comprises:

determining that the electronic device is in a do-not-disturb mode in which an audible ringer of the device is turned off, wherein the controller transmits the change activation signal further in response to the electronic device being in the do-not-disturb mode; and generating a first change activation signal that modifies the external panel material to present the second visible state, in response to receiving the communication from the first pre-approved contact while the electronic device is in the do-not-disturb mode.

20. A computer program product comprising:

a computer readable storage device; and program code on the computer readable storage device that when executed by a processor associated with an electronic device having an external panel comprised of a material having an exterior visual characteristic that can be dynamically changed by a device-generated trigger, the program code enables the electronic device to provide functionality of:

receiving an input corresponding to a first context, the first context being pre-identified as a condition that triggers a change in the exterior visual characteristic of the material;

identifying from sensor input received from an orientation sensor whether the electronic device is in a first orientation where the external panel is visible to a device user; and in response to the electronic device being in the first orientation concurrently with receiving the input corresponding to the first context, generating and transmitting a change activation signal that results in a change in the exterior visual characteristic of the material from a first visible state to a second visible state.

* * * * *